(12) United States Patent  (10) Patent No.: US 7,866,828 B2
Nakagawa et al.  (45) Date of Patent: Jan. 11, 2011

(54) PROJECTION TYPE IMAGE DISPLAY APPARATUS

(75) Inventors: Norio Nakagawa, Osaka (JP); Atsushi Kubo, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 524 days.

(21) Appl. No.: 11/874,964

(22) Filed: Oct. 19, 2007

(65) Prior Publication Data

US 2008/0094581 A1   Apr. 24, 2008

(30) Foreign Application Priority Data

Oct. 19, 2006   (JP)   .............................. 2006-285585

(51) Int. Cl.
G03B 21/26   (2006.01)
(52) U.S. Cl. .............................. 353/58; 353/52; 353/57; 353/59; 353/60; 353/61; 362/29; 362/345; 362/362; 362/373; 416/183; 416/198 R; 416/223 R; 349/161; 348/748
(58) Field of Classification Search ................... 353/52, 353/57, 58, 60, 61, 59; 362/29, 345, 362; 362/373; 416/183, 198 R, 223 R; 349/161; 348/748
See application file for complete search history.

(56) References Cited

U.S. PATENT DOCUMENTS

| 6,203,159 | B1 | 3/2001 | Takizawa | |
|---|---|---|---|---|
| 7,018,049 | B2 * | 3/2006 | Wu et al. | ........................ 353/58 |
| 7,137,706 | B2 * | 11/2006 | Kawahara et al. | .............. 353/57 |
| 2002/0018183 | A1 * | 2/2002 | Ito et al. | ........................ 353/20 |
| 2002/0163627 | A1 * | 11/2002 | Ohishi et al. | ................... 353/58 |
| 2003/0174289 | A1 | 9/2003 | Nakano | |
| 2003/0202160 | A1 * | 10/2003 | Chimura et al. | ................ 353/52 |
| 2004/0141155 | A1 | 7/2004 | Wang et al. | |
| 2005/0019165 | A1 * | 1/2005 | Fujimori et al. | .......... 416/223 R |

(Continued)

FOREIGN PATENT DOCUMENTS

CN   1704839 A   12/2005

(Continued)

OTHER PUBLICATIONS

Chinese Office Action dated May 8, 2009, issued in corresponding Chinese Patent Application No. 2006-10125656.1.

Primary Examiner—Georgia Y Epps
Assistant Examiner—Sultan Chowdhury
(74) Attorney, Agent, or Firm—Westerman, Hattori, Daniels & Adrian, LLP

(57) ABSTRACT

An image display apparatus has a first exhaust fan (13) for mainly exhausting air from a light source unit (9) and discharging the air to the outside of the image display apparatus and a second exhaust fan (14) for mainly exhausting air from a power supply unit (11) and discharging the air to the outside of said image display apparatus. The inspiration face of the second exhaust fan is arranged to partly overlap the expiration face of the first exhaust fan. Accordingly, the internal temperature of the image display apparatus, and hence the temperature of the exhaust air, can be efficiently reduced, and at the same time fan noise of the fans can be reduced. As a result, uprating of power of the light source unit and downsizing of an image display apparatus can be simultaneously achieved.

5 Claims, 27 Drawing Sheets

U.S. PATENT DOCUMENTS

| | | |
|---|---|---|
| 2005/0243285 A1 * | 11/2005 | Yamada et al. ................. 353/52 |
| 2005/0264766 A1 | 12/2005 | Morimoto et al. |
| 2007/0019168 A1 * | 1/2007 | Nakagawa et al. ............ 353/58 |
| 2008/0094581 A1 | 4/2008 | Nakawaga et al. |

FOREIGN PATENT DOCUMENTS

| | | |
|---|---|---|
| JP | 8-275096 A | 10/1996 |
| JP | 200019644 A | 1/2000 |

* cited by examiner

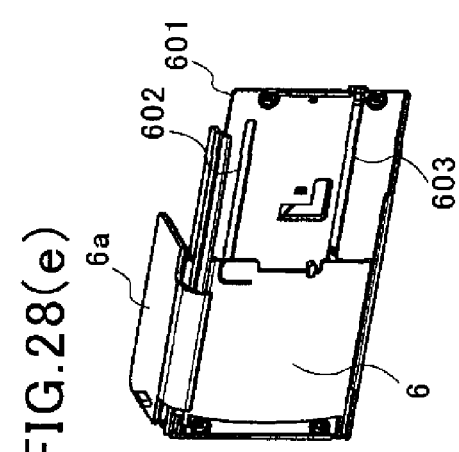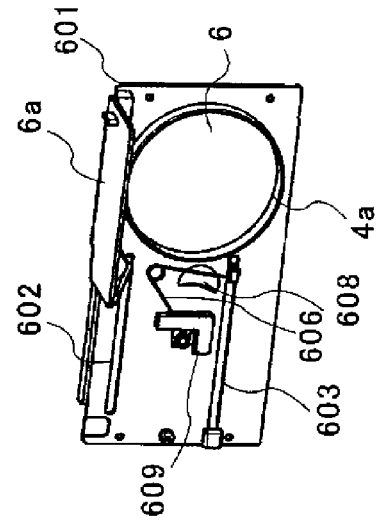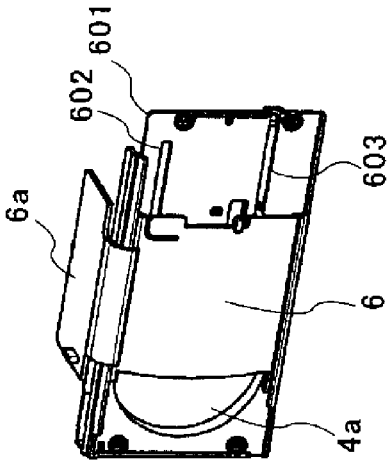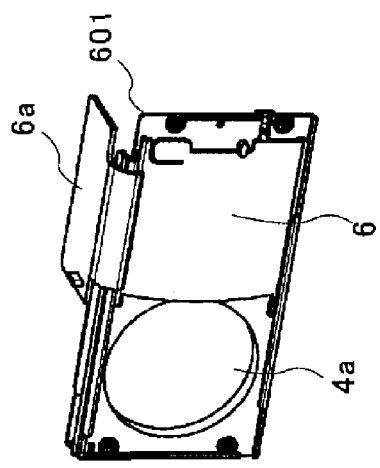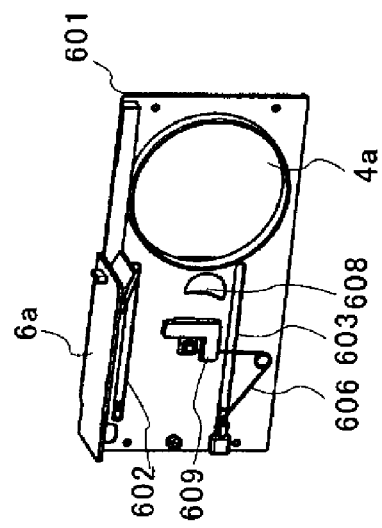

PROJECTION TYPE IMAGE DISPLAY APPARATUS

FIELD OF THE INVENTION

This invention relates to a projection type image display apparatus for projecting imaging light formed by modulating a beam of light from a light source unit based on an image signal, the apparatus having an exhaust mechanism in the neighborhood of the light source unit.

BACKGROUND OF THE INVENTION

Most electronic apparatuses have exhaust fans for ventilating their power supply units. That is the case with a projection type image display apparatus, such as a liquid crystal projector, that includes a high-luminescence light source such as a high-pressure mercury lamp, which operates at a high temperature. Since the air in the light source unit can be heated to a higher temperature than that in the power supply unit, a measure is taken to ventilate the light source unit. For example, the blast power (or rotational speed) of the exhaust fan is raised to the maximum level, or a larger exhaust fan is employed, or multiple exhaust fans are provided.

Japanese Patent Application Laid Open No. 2000-19644 discloses an image display apparatus equipped with two adjoining exhaust fans, installed near the light source unit, for ventilating its light source unit and power supply unit.

SUMMARY OF THE INVENTION

However, if the blast power of the fan is raised to the maximum level (or maximum rotation speed), the noise level of an exhaust fan increases. On the other hand, if a large exhaust fan is employed or if two adjoining fans are used as disclosed in the cited document, a large installation space is required, which will make the dimensions of the image display apparatus large.

Recently, downsizing of a projection type image display apparatus such as a liquid crystal projector and power uprating of its light source unit are demanded simultaneously. However, under conventional technology, simultaneous reduction of the noise level and the internal temperature of the image display apparatus, and hence the temperature of the exhaust air, is becoming increasingly difficult.

It is, therefore, an object of the present invention to overcome these prior art problems by providing a compact projection type image display apparatus having an exhaust mechanism capable of efficiently reducing the internal temperature of the image display apparatus and at the same time reducing its noise level while allowing use of a high-power light source.

SUMMARY OF THE INVENTION

In fulfilling the above object, there is provided in accordance with one aspect of the invention a projection type image display apparatus for projecting imaging light formed by modulating a beam of source light based on an image signal, the image display apparatus equipped with an exhaust mechanism for exhausting air from the image display apparatus that includes a light source unit and discharging the air to the outside of the image display apparatus, the exhaust mechanism having a first exhaust fan for mainly exhausting air from the light source unit and discharging the air to the outside of the image display apparatus; and a second exhaust fan for mainly exhausting air from the components other than the light source unit and discharging the air to the outside of the image display apparatus, the second exhaust fan having an inspiration face arranged to partly overlap the expiration face of the first exhaust fan.

The high temperature air expired from the light source unit by the first exhaust fan is partly discharged to the second exhaust fan, and then to the outside of the image display apparatus by the second exhaust fan.

Thus, exhaustion of the hottest air in the image display apparatus can be facilitated by forcibly distributing the air over the two overlapping fans, without employing a larger exhaust fan or maximizing the blast power (rotational speed) of an exhaust fan. Accordingly, the internal temperature of the image display apparatus, and hence the temperature of the exhaust air, can be efficiently reduced, and at the same time fan noise of the fans can be reduced. As a result, uprating of power of the light source unit and miniaturization of an image display apparatus can be simultaneously achieved.

In this case, the second exhaust fan may be used to mainly exhaust air from the power supply unit to the outside of the image display apparatus.

Thus, although the power supply unit is not heated so much as the light source unit, the power supply unit can be simultaneously ventilated.

The first and the second exhaust fans are preferably arranged at oblique angles with respect to the exhaust port therefor.

In this arrangement, portions of the fans in immediate proximity to the exhaust port can be lessened and the noise of the two fans can be reduced by just that amount lessened.

The first and second exhaust fans are preferably oriented in an oblique forward direction with respect to an exhaust port formed in a sidewall of the image display apparatus.

This arrangement can prevent exhaustion of high-temperature exhaust air directly to the operator located on that side of the exhaust port.

The second exhaust fan preferably has less output power than the first exhaust fan.

Then, a pressure difference will be generated between the two fans that urges the hot exhaust air from the first exhaust fan to the second exhaust fan.

BRIEF DESCRIPTION OF THE DRAWINGS

FIG. 28 shows operation of the lens cover slide mechanism.

BEST MODE FOR CARRYING OUT THE INVENTION

The invention will now be described in detail by way of example with reference to the accompanying drawings.

Figure 1:
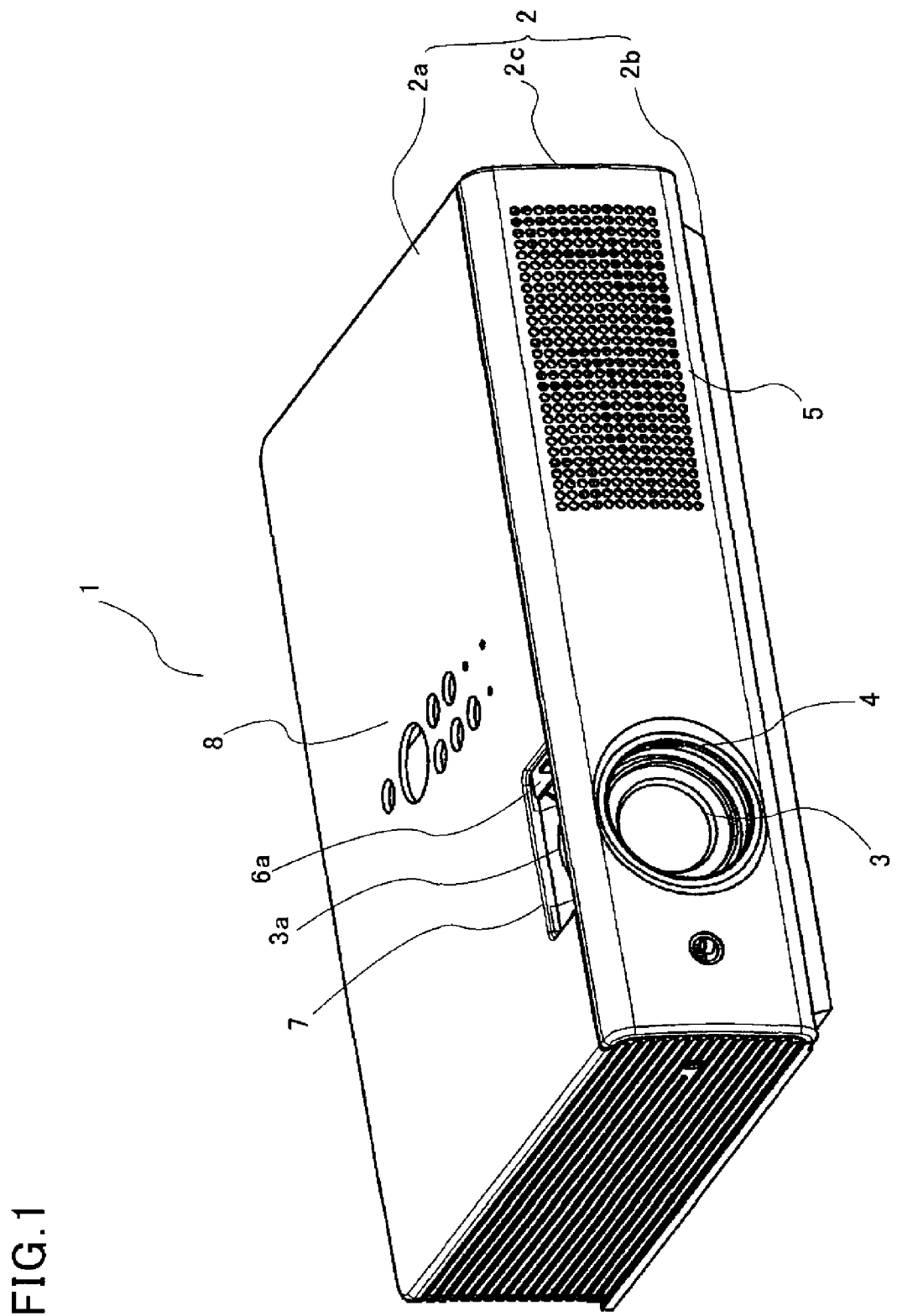
FIG. 1 is a perspective view of a projection type image display apparatus in the form of a liquid crystal projector in accordance with one embodiment of the invention, as viewed from an upper front end of the apparatus.
Figure 2:
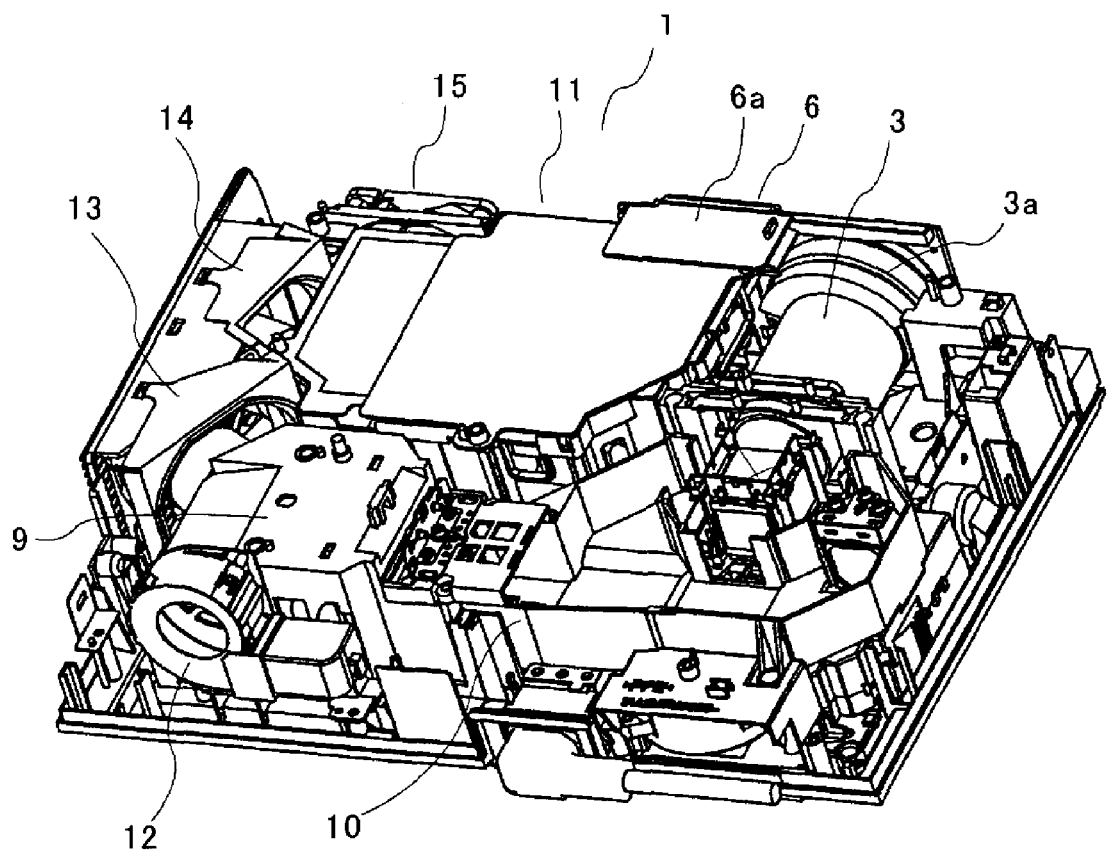
FIG. 2 is a perspective view of the liquid crystal projector as viewed from an upper rear end thereof, with the upper case, front case, and main control board removed.

Referring to FIG. 1, there is shown in perspective view a projection type image display apparatus in the form of a liquid crystal projector in accordance with one embodiment of the present invention, as viewed from an upper oblique direction to the front end of the display apparatus. FIG. 2 is another perspective view of the liquid crystal projector as viewed from an upper oblique direction to the rear end of the display apparatus, with the upper case, front case, and main control board removed.

As seen in FIG. 1, an exterior case 2 for housing the liquid crystal projector 1 consists of an upper case 2a, a lower case 2b, and a front case 2c. The interior of the projector can be seen by removing the upper case 2a, front case 2c, and a main control board (not shown), as shown in FIG. 2.

When viewed from the front end, the front case 2c is provided in the left side thereof with a projection window 4 for exposing a projection lens 3. Formed in the right side is an exhaust port 5 having a plurality of small round holes. The projection window 4 can be opened or closed with a lens cover 6, as shown in FIG. 2.

Formed in the upper left section of the upper case 2a, in association with the projection window 4, is an access window 7 for allowing an operator to manipulate an adjustment dial 3a for zooming and focusing of the projection lens 3. Provided on the central area of the upper case 2a are indicators 8. The access window 7 can be opened or closed with an access window cover 6a, which is formed integral with the lens cover 6.

Further, an exhaust port (not shown in FIG. 1) is formed in the right end of the upper case 2a (as viewed from the front end of the upper case 2a), and an air inlet formed in the right side of the rear end of the upper casing 2a. Provided on the opposite sides, and near the front end, of the bottom end of the lower case 2b are legs (not shown) that can be adjusted in length.

As shown in FIG. 2, a light source unit 9 is provided in a right far end section of the exterior case 2. A generally L-shaped optical system 10 extends from the light source unit 9 to the projection lens 3. A power supply unit 11 is arranged in front of the light source unit 9.

An air intake fan 12 is arranged behind the light source unit 9, and an exhaust fan 13 arranged to the right of the light source unit 9 (closer to the side wall). A further exhaust fan 14 is provided on one side of the power supply unit 11 in such a way that the inspiration face of the fan 14 partly overlaps the expiration face of the exhaust fan 13. A still further exhaust fan 15 is provided in the front end of the power supply unit 11.

Figure 3:
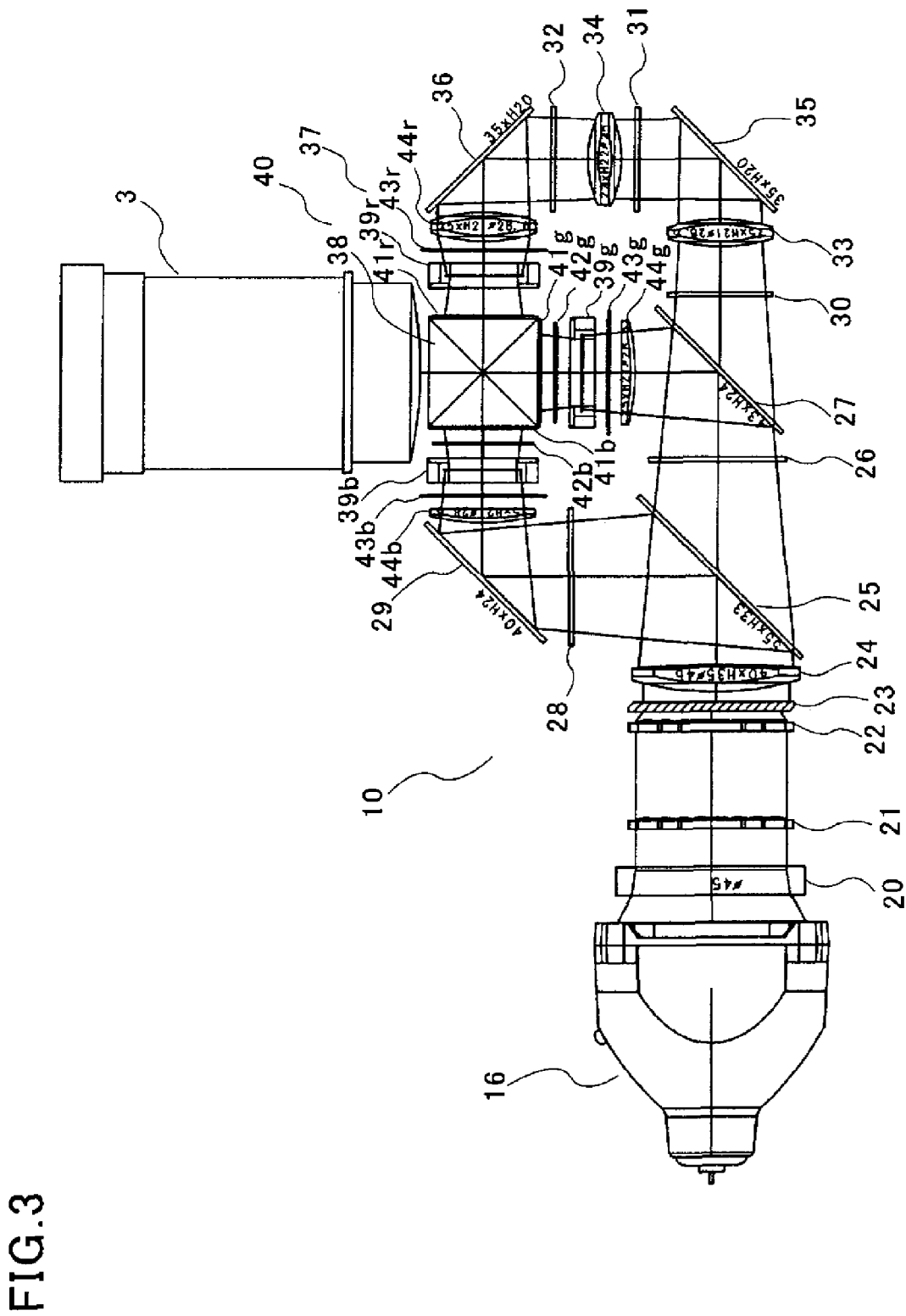
FIG. 3 is a diagram showing an exemplary arrangement of an optical system of the image display apparatus.
Figure 4:
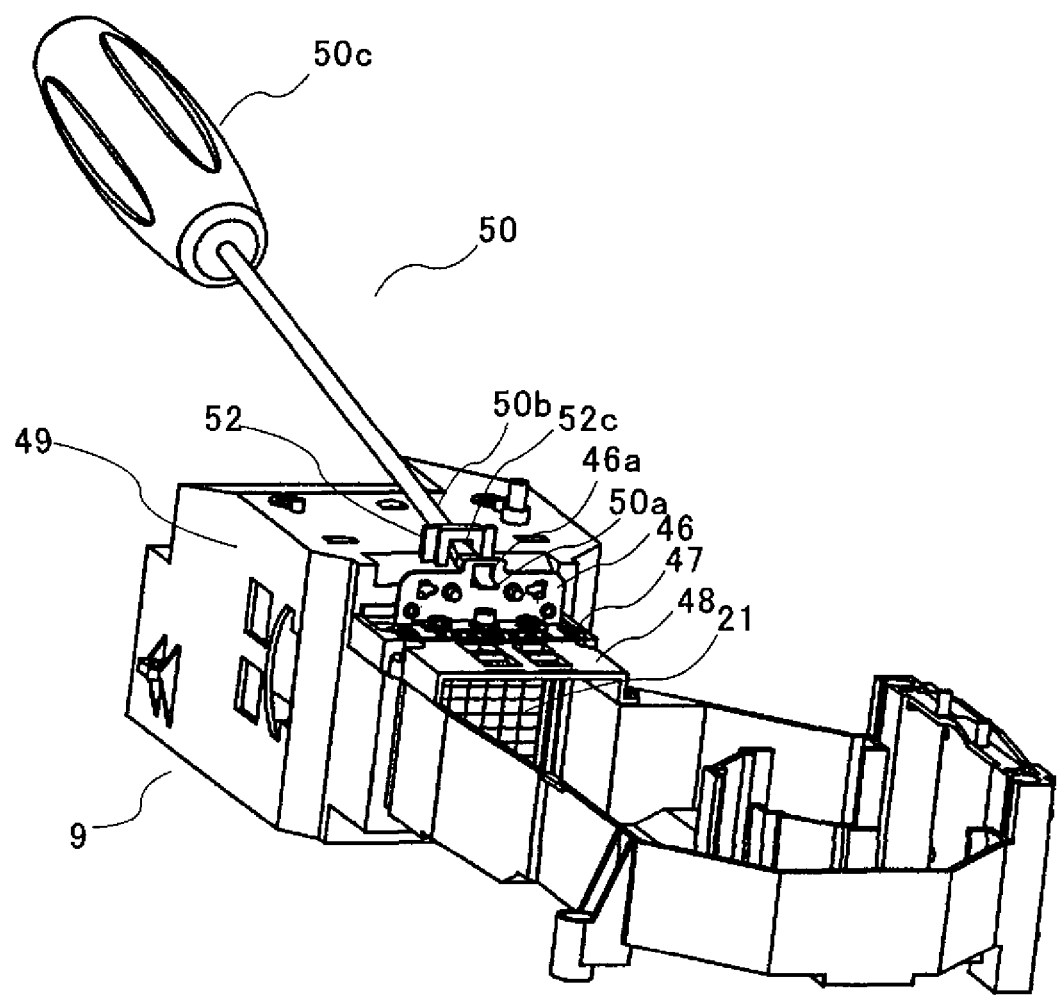
FIG. 4 is a perspective view of the optical panel adjustment mechanism used in one embodiment of the invention.
Figure 5:
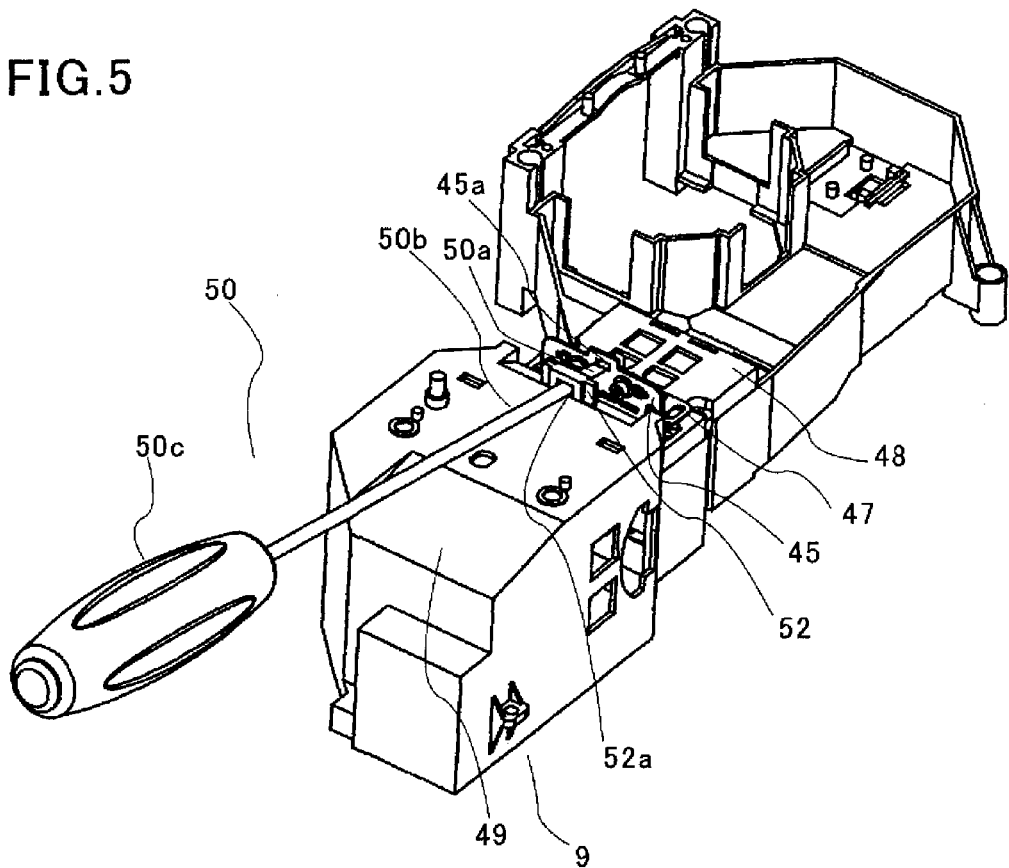
FIG. 5 is another perspective view of the optical panel adjustment mechanism as viewed from another direction.
Figure 6:
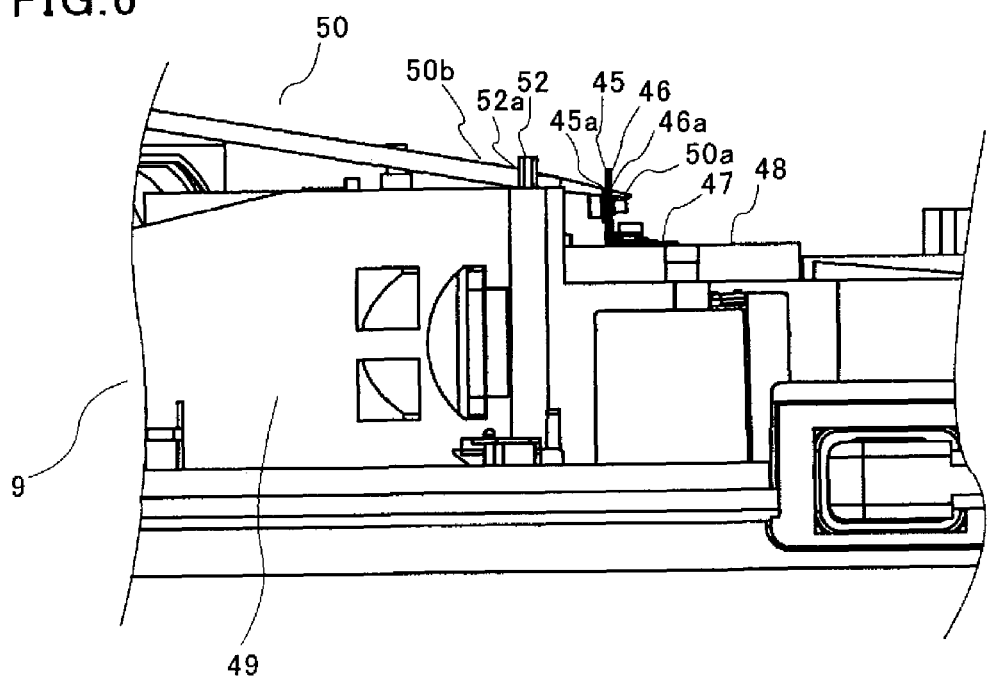
FIG. 6 is a side elevational view of the optical panel adjustment mechanism.
Figure 7:
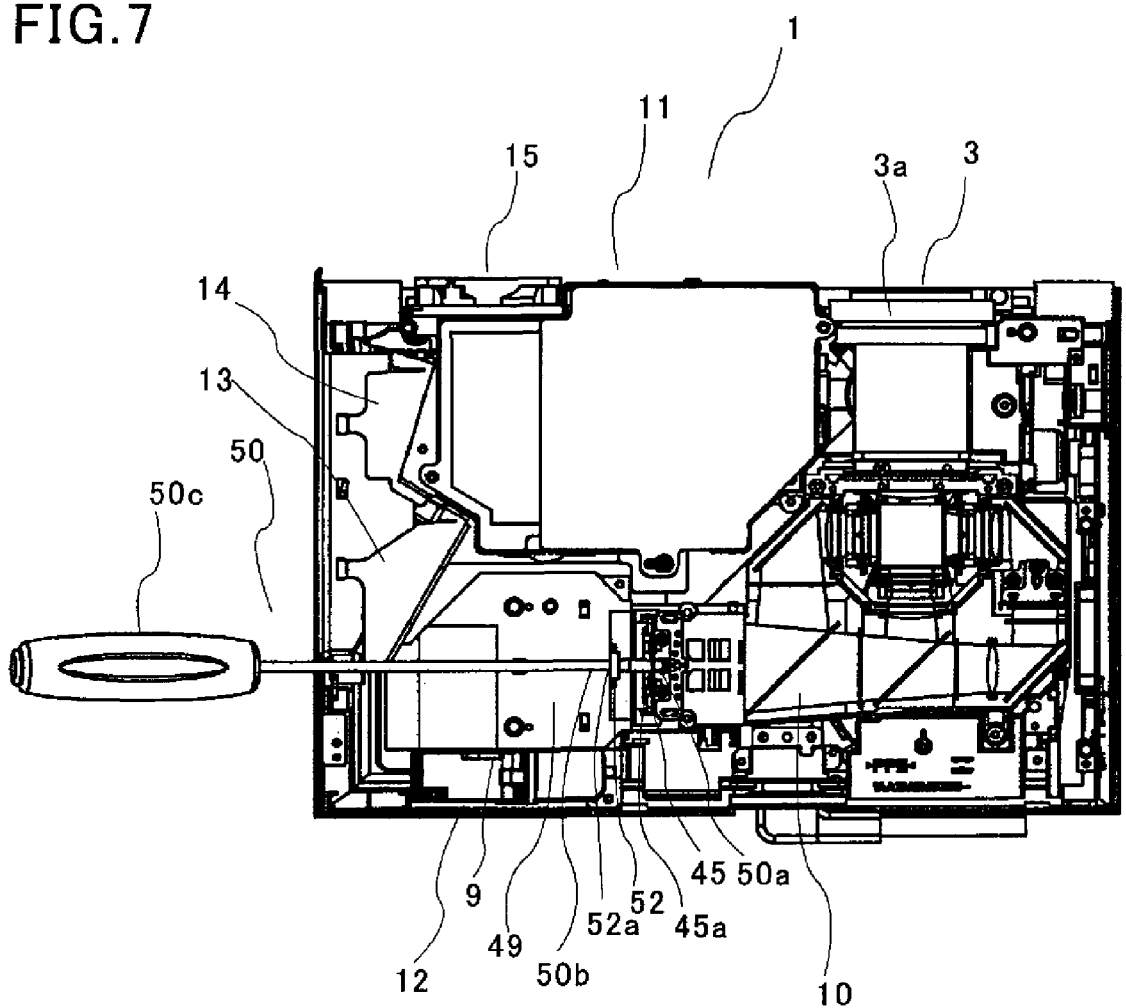
FIG. 7 is a plan view of the optical panel adjustment mechanism.

FIG. 3 shows an exemplary configuration of the optical system 10. It should be understood that the optical system 10 is not limited in configuration to the one shown in FIG. 3, and therefore the invention incorporates a variety of image display apparatuses equipped with various types of optical systems.

As seen in FIG. 3, white light emitted from the lamp 16 serving as a light source is led to a first dichroic mirror 25 via a first condenser lens 20, a first integrator lens 21, a second integrator lens 22, a polarization beam splitter (PBS) 23, and a second condenser lens 24.

Each of the first and second integrator lenses 21 and 22, respectively, comprises a fly-eye lens, which consists of a matrix of multiple heat-resistant lenses, adapted to uniformize the illumination distribution of the white light received from the lamp 16. The polarization beam splitter 23 extracts either one of the P and S waves of light.

The light that has passed through the polarization beam splitter 23 is fed to the first dichroic mirror 25 via the condenser lens 24. The first dichroic mirror 25 reflects only the blue component of light, that is, it allows the red and green components to pass through it, causing the red and green components to enter a second dichroic mirror 27 via a filter 26. The second dichroic mirror 27 reflects the green component of light, allowing the red component to pass through it.

As a consequence, the white light emitted from the lamp 16 is split into blue, green, and red light by the first and second dichroic mirrors 25 and 27, respectively.

The blue light reflected by the first dichroic mirror 25 passes through a filter 28 and is further reflected by a total reflection mirror 29 to an image forming optical system 37. The green light reflected by the second dichroic mirror 27 is directly led to the image forming optical system 37, while the red light that has passed through the second dichroic mirror 27 is led to the image forming optical system 37 via filters 30, 31, and 32 and relay lenses 33 and 34, and total reflection mirrors 35 and 36.

The image forming optical system 37 has a detachable prism assembly 40 comprising a cubic color composition prism 38 and three liquid crystal panels (LCPs) 39*r*, 39*g*, and 39*b* for red, green, and blue light, respectively, mounted on the three faces of the cubic color composition prism 38 (the respective LCPs hereinafter referred to as R-LCP, G-LCP, and B-LCP). A polarization plate 41*r* is provided between the color composition prism 38 and the R-LCP 39*r*. An emergence polarization plate 41*g* and an emergence pre-stage polarization plate 42*g* are provided between the color composition prism 38 and the G-LCP 39*g*. An emergence polarization plate 41*b* and an emergence pre-stage polarization plate 42*b* are provided between the color composition prism 38 and the B-LCP 39*b*. Mounted on the light entering sides of the LCPs 39*r*, 39*g*, and 39*b* are respective incidence polarization plates 43*r*, 43*g*, and 43*b* and condenser lenses 44*r*, 44*g*, and 44*b*.

As a consequence, the blue light reflected by the first dichroic mirror 25 and the total reflection mirror 29 is led to the condenser lens 44*b* for blue light, and further to the color composition prism 38 via the incidence polarization plate 43*b*, B-LCP 39*b* and emergence pre-stage polarization plate 42*b*, and emergence polarization plate 41*b*. The green light reflected by the second dichroic mirror 27 is led to the condenser lens 44*g*, and further to the color composition prism 38 via the incidence polarization plate 43*g*, G-LCP 39*g*, emergence pre-stage polarization plate 42*g*, and emergence polarization plate 41*g*. In a similar manner, the red light that has passed through the first and second dichroic mirrors 25 and 27, respectively, and gets reflected by the two total reflection mirrors 35 and 36 is led to the condenser lens 44*r*, and further to the color composition prism 38 via the incidence polarization plate 43*r*, R-LCP 39*r*, and emergence polarization plate 41*r*.

The beams of imaging light of three colors led to the color composition prism 38 are compounded in the color composition prism 38 to form a beam of colored imaging light, which is projected by the projection lens 3 onto a front screen.

Referring to FIGS. 4-8, there is shown an optical panel adjustment mechanism in accordance with one embodiment of the invention. More particularly, the optical panel adjustment mechanism is schematically shown in perspective view in FIGS. 4 and 5, in side elevational view in FIG. 6, and in plan view in FIG. 7. A relevant section of the optical panel adjustment mechanism is shown in enlarged perspective view in FIG. 8.

In the embodiment shown herein, the optical panel adjustment mechanism is applied to the first integrator lens 21, while the second integrator lens 22 is firmly fixed.

Figure 8:
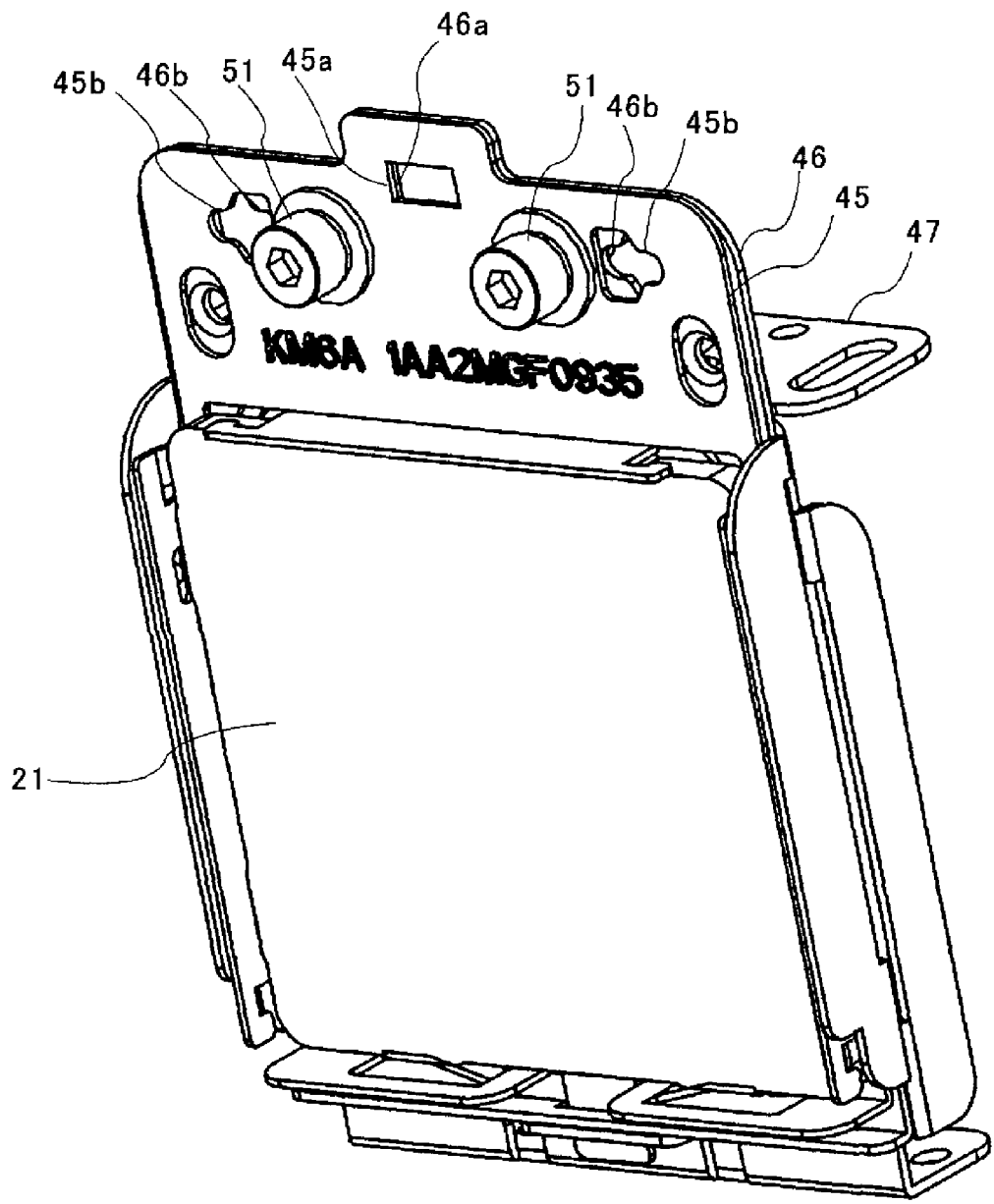
FIG. 8 is an enlarged perspective view of the optical panel adjustment mechanism.

The first integrator lens 21 is substantially square in shape and firmly mounted on a holding frame 45 having an opening formed in association with the first integrator, lens 21. This holding frame 45 is movably mounted on a similar first mounting frame 46 in such a way that the opposite ends of the holding frame 45 can be guided by the first mounting frame 46 in a vertical direction (in the direction of Y-axis), as shown in FIG. 8. The first mounting frame 46 is mounted on a second mounting frame 47 movably in horizontal direction (or in the direction of X-axis). The second mounting frame 47 is in turn mounted on a third mounting frame 48 (FIGS. 4-7) moveably in the direction of the optical axis (Z axis). Further, the third mounting frame 48 is detachably mounted on the front end of a light source housing 49. The mechanism for effecting adjustment of the first integrator lens 21 in the horizontal direction (along X axis) and in the direction of the optical axis (Z axis) is not shown, since it is not directly related to the present invention. It can be a combination of guide slits and screws.

Formed in an upper central area of the holding frame 45 is a horizontally elongate rectangular hole (referred to as insertion hole) 45*a* for allowing insertion of the tip 50*a* of a stick-shaped jig (e.g. flathead driver 50) through it. Formed on the opposite sides of the insertion hole 45*a* are vertically long screw holes (not shown), through which fixing screws 51 are fixed to the first mounting frame 46. On the other hand, the first mounting frame 46, formed in association with the insertion hole 45*a* of the holding frame 45, is provided with an insertion hole 46*a* which is longer than the insertion hole 45*a* in the vertical (or longitudinal) direction but has the same transverse width as the insertion hole 45*a*.

Incidentally, in order to permit the tip of the flathead driver 50 to be inserted, two pairs of overlapping transverse insertion holes 45*b* and 46*b* are formed in the opposite sides of upper sections of the respective holding frame 45 and the first mounting frame 46, as shown in FIG. 8. Each of the paired insertion holes 45*b* and 46*b* has a generally anastatic shape and oriented in the opposite direction relative to the counterpart.

On the other hand, as shown in FIGS. 4 through 7, a rib 52 is provided at the upper central section of the front end of the light source housing 49. This rib 52 has an insertion hole 52*a* for insertion of a flathead driver 50 through it. This insertion hole 52*a* serves as a fulcrum of the driver 50 inserted through it when the tip 50*a* of the driver 50 is inserted into the hole 45*a* of the holding frame 45 and the grip 50*c* of the driver 50 is moved up and down. This insertion hole 52*a* has a size sufficient for the tip 52*a* and the shaft 52*b* of the flathead driver 50 to penetrate through it.

In this arrangement, to adjust the vertical position of the first integrator lens 21, the tip 50*a* of the flathead driver 50 (jig) inserted in the insertion hole 45*a* is moved up or down by moving the grip 50*c* of the driver 50 about the fulcrum 52*a*, which enables the first integrator lens 21 to be moved in the vertical direction by virtue of leverage of the driver, without being inclined (rotated) about the optical axis. Thus, this arrangement provides an easy way of adjusting vertical position of the first integrator lens 21, thereby facilitating improvements of the productivity and the quality of the image display apparatus.

Incidentally, it is noted that since the mechanism for effecting adjustment in the horizontal direction (X-axis) and in the direction along the optical axis (Z-axis) consists of general-purpose transverse guide slits and screws, the mechanism will not result in inclination of the first integration lens 21.

It is also noted that by providing the first integrator lens 21 close to the light source unit 9 and forming the fulcrum hole 52*a* in the rib 52 that protrudes from the upper end of the light source housing 49, the light source housing 49 can be effectively utilized to establish a costless and easy-to-operate adjustment mechanism, as described above.

It is further noted that since the insertion hole 45*a* for inserting through it the tip 50*a* of a flathead driver 50 and the fulcrum hole 52a are formed in the holding frame 45, the flathead driver 50 can be advantageously utilized as an easy-to-use adjustment jig.

The paired transverse anastatic holes 45b and 46b formed in the opposite sides of the upper sections of the holding frame 45 and first mounting frame 46 are of conventional ones, which are basically not necessary for the purpose of the invention, since these holes can result in inclination of the first integrator lens 21 about the optical axis. However, the invention can take advantage of these holes to overcome conventional drawback as mentioned above. That is, should an inadvertent inclination of the first integrator lens 21 take place for some reason, the anastatic holes 45b and 46b can be used to adjust the inclination by inserting the tip 50a of the flathead driver 50 therein and rotating the driver.

In this way, utilizing a costless and easy-to-operate adjustment mechanism capable of adjusting the integrator lens 21 in a simple manner in accordance with the embodiment, a liquid crystal projector having good productivity and a high quality can be realized.

Figure 9:
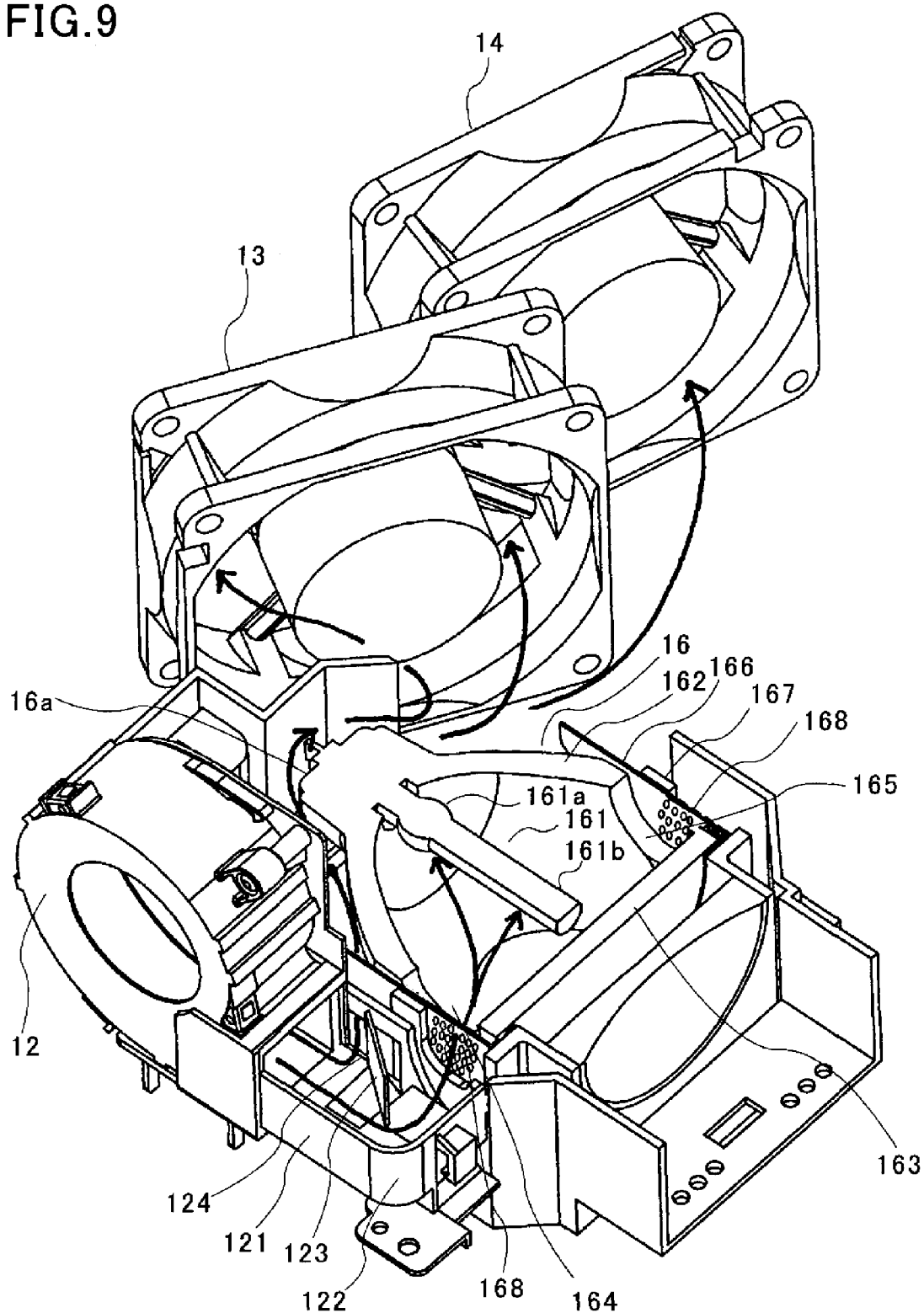
FIG. 9 is an enlarged cross sectional view of the relevant section of a lamp cooling mechanism.

Referring to FIG. 9, there is shown in enlarged cross section a lamp cooling mechanism in accordance with one embodiment of the invention. For better illustration, the lamp and its peripheral components are shown in cross section.

In the embodiment shown herein, in order to raise the output power of the light source while downsizing and lightening the image display apparatus, a 300-Watt extra high-pressure mercury lamp is used as the lamp 16, along with a small light-weight air intake fan 12. It should be appreciated that in this embodiment a 300-Watt lamp is installed using a chassis of a conventional size, in spite of the fact that the output power of the lamp has been conventionally limited to 200-Watt for this size of chassis.

The lamp 16 has a luminous tube 161 in the form of an extra high-pressure mercury lamp, a reflector 162 covering the luminous tube 161 and having a parabolic reflective surface and a front opening, and a heat-resistive glass plate 163 for closing the front opening of the reflector 162. A generally spherical section 161a near the base of the luminous tube 161 is a luminous section that contains discharge electrodes for generating source light. The reflector 162 is provided with a pair of opposing air intake port 164 and an exhaust port 165 formed near the front end of the reflector 162.

This lamp 16 is mounted on a resin holder 167 via an aluminum holder 166, and then removably installed in the light source housing 49 through an opening (not shown) formed in the lower case 2b of FIG. 1. The aluminum lamp holder 166 is provided with a ventilatory net 168 having a plurality of small holes, in association with the air intake port 164 of the reflector 162 and the exhaust port 165. The net 168 is configured so as to prevent the debris of a ruptured luminous tube 161 from scattering in the event that the luminous tube is broken.

A cooling fan 12 is provided at a position lateral to the base of the lamp 16, and a duct 121 is provided to guide forward the air sent from the fan 12. Further, the duct 121 has a curved wall 122 for directing the air in the duct 121 to the air intake port 164 formed near the open end of the lamp 16.

Provided in the duct 121 is a further guide plate 123 for spreading the air stream redirected by the curved section 122 over the region from the tip 161b to the luminous section 161a of the lamp 16. The guide plate 123 is oriented to a vent hole, which is adapted to bifurcate the air stream in the duct 121 to establish an air stream that flows from the exterior surface of the lamp 16 to the base 16a of the lamp 16.

In this arrangement, owing to the cooperative action of the curved section 122 and the guide plate 123 formed in the duct 121, the air stream in the duct 121 is distributed over the region from the tip 161b to the luminous section 161a of the lamp 16. As a consequence, not only the tip 161b but also the luminous section 161a of the luminous tube 161 of the lamp 16 can be efficiently cooled, thereby simultaneously enabling uprating of power of the light source unit and minimization and lightening of the image display apparatus without supplying the air intake fan 12 with a large amount of power.

As described above, since the guide plate 123 is oriented to the vent hole 124 adapted to bifurcate the air stream in the duct 121 into two streams, one to the exterior of the lamp 16 and another to the base 16a of the light source unit 16, the base 16a of the lamp 16 is also cooled efficiently.

The exhaust air that has cooled the relevant sections of the lamp 16 is discharged to the outside of the image display apparatus by the exhaust fans 13 and 14.

The ventilatory net 168 provided to air inlet 164 of the reflector 162 is preferably arranged perpendicularly to the direction of the air stream through the inlet 164, since the plurality of holes of the net then have the maximum possible area, and hence the minimum air resistance, to the stream, yet the net can prevent scattering of debris of a ruptured luminous tube out of the lamp 16.

Thus, utilizing a lamp cooling mechanism capable of efficiently cooling relevant sections of the lamp 16 without supplying a large amount of power to the air intake fan 12 in accordance with the embodiment as described above, a liquid crystal projector equipped with a high-output lamp can be obtained in a compact and light weight configuration.

Figure 10A:
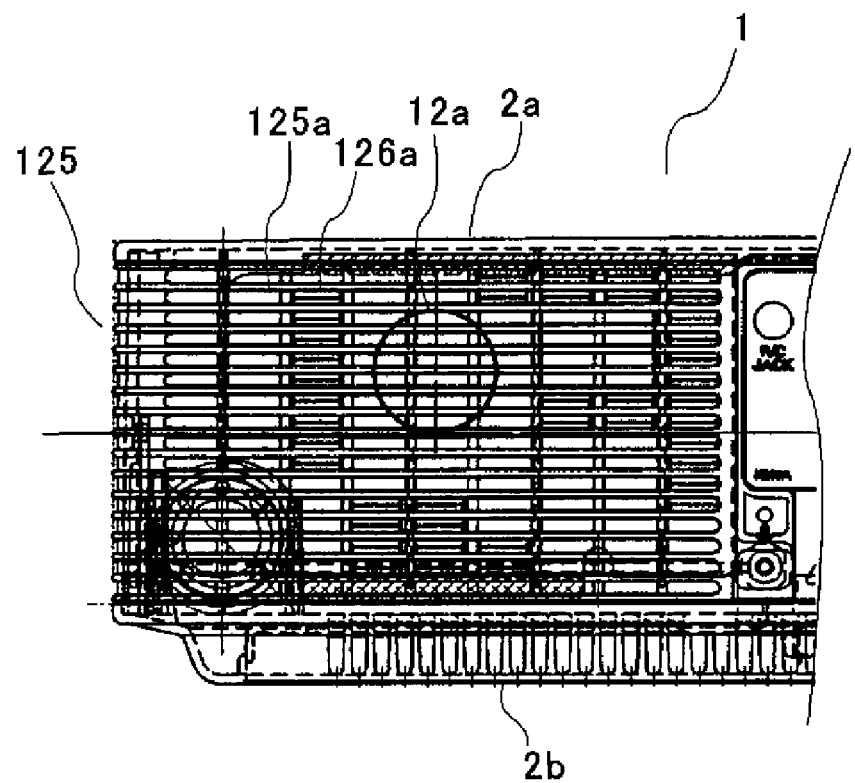
FIG. 10 is a diagram showing a ventilation mechanism in accordance with one embodiment of the invention.
Figure 10B:
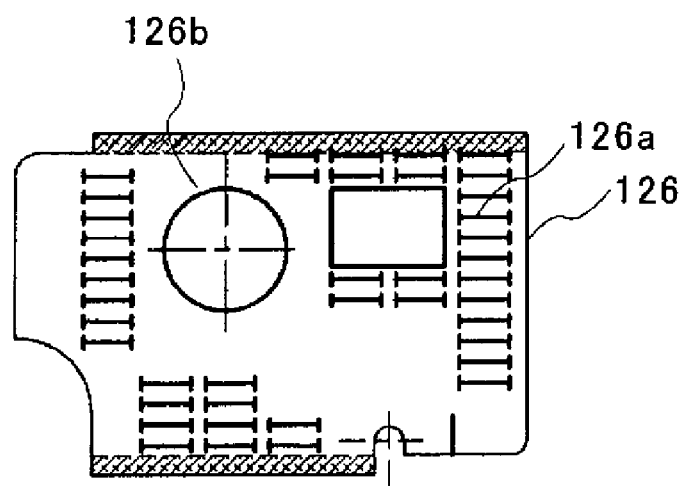

Referring to FIG. 10, there is shown a ventilation mechanism of an air inlet (ventilatory opening) 125 formed in association with the air intake fan 12. More particularly, the arrangement of the air inlet 125 formed in the rear end of the upper case 2a is shown in FIG. 10(a), and a shading sheet 126 attached to the inside of the air inlet 125 in FIG. 10(b).

A plurality of latticed vent holes 125a are formed in the air inlet 125. The vent holes 125a, however, can leak light from the light source unit 9 and make the interior of the image display apparatus visible.

On the other hand, the shading sheet 126 is a black non-woven fabric sold by AMBIC, Inc. under the name of Himelon (registered trademark), and has a certain air permeability, but it still exhibits non-negligible air resistance if used as it is, and results in rise in temperature inside the case.

In this embodiment, therefore, slits 126a are formed in the shading sheet 126, each slit being an H-shaped cut formed at the position of a corresponding one of the vent holes 125a of the air inlet 125. The shape and size of the H-shaped slit is determined by the shape and size of the corresponding vent hole 125a. In the example shown herein, the shading sheet 126 is formed with horizontally long H-shaped slits, as shown in FIG. 10(b), since associated vent holes 125a are latticed horizontally long slits.

To facilitate reduction of the air resistance of the shading sheet 126, the shading sheet 126 is also formed with a hole 126b in correspondence with the inlet 12a of the air intake fan 12.

The slits 126a may be formed over the entire shading sheet 126, or, as shown in FIG. 10, over a limited area as needed, depending on the internal conditions of the image display apparatus.

The slits 126a thus formed reduce the air resistance of the entire shading sheet, permitting smooth flow of air through it and hence facilitating ventilation of the image display apparatus. Thus, the slits can shield light and suppress the internal temperature from rising at low cost.

It is noted that the above mentioned air permeability of the sheet 126 can be obtained without deteriorating its light shielding property by forming each slit 126a in the form of an H-shaped cut Since each H-shaped cut 126a is in accord with the shape and size of the corresponding vent hole 125a, the cut 126a can be easily opened by air passing through it, thereby reducing its air resistance and contributes to further suppression of the internal temperature.

Thus, utilizing the ventilation mechanism having a shading sheet 126 formed with H-shaped cuts or slits 126a, a liquid crystal projector 1 capable of shading light at low cost and suppressing the internal temperature can be realized in accordance with the present embodiment.

Although the invention has been described above with reference to an embodiment in which the ventilation mechanism has the air inlet 125 for cooling the light source unit 9, the invention can be equally applied to other case equipped with different types of air inlets and exhaust ports.

Figure 11:
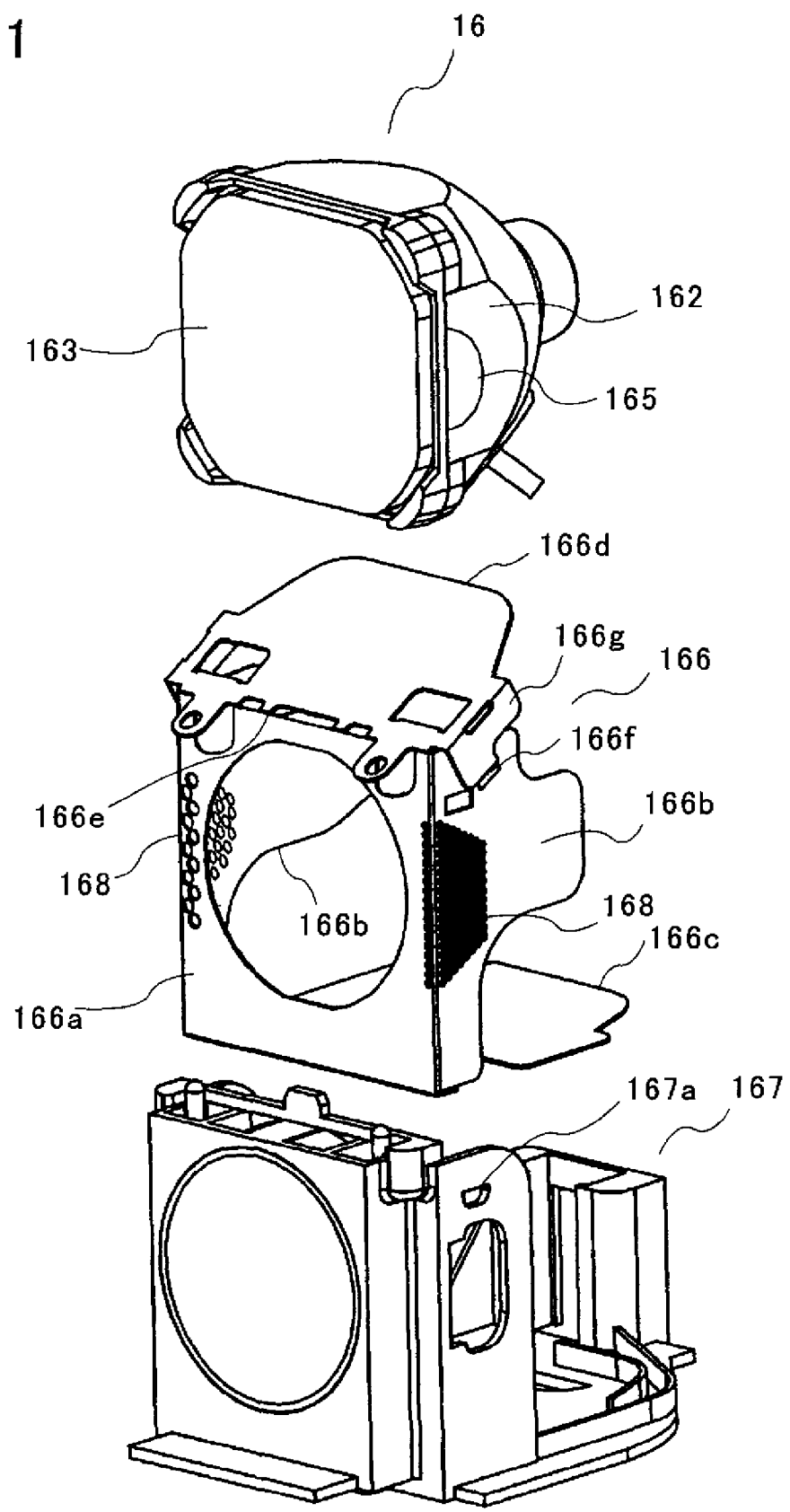
FIG. 11 is an exploded perspective view of a lamp mounting mechanism in accordance with one embodiment of the invention.

Referring to FIG. 11, there is shown in exploded perspective view a lamp mounting mechanism in accordance with one embodiment of the invention, in which the same elements shown in FIGS. 9 and 11 are denoted by the same reference numerals.

Conventionally, a lamp is mounted directly on a resin lamp holder. Such resin lamp holder is likely to be deteriorated rather quickly due to heat from the lamp. Therefore, a high-power cooling fan is required to cool the lamp holder. An even larger and higher-power cooling fan has become increasingly needed under the current trend in which the output power of the light source unit is powered up and the chassis of the image display apparatus is down sized, because otherwise the resin lamp holder can be heated to a temperature above its melting point when the lamp is directly mounted on the resin holder. This not only entails increased fan noise but also thwarts simultaneous realization of uprating of power and downsizing of an image display apparatus.

In the embodiment shown herein, therefore, there is provided between the lamp 16 and the resin lamp holder 167 an intervening aluminum lamp holder 166 having a good heat radiation capability. This aluminum lamp holder has a section exposed out of the resin lamp holder 167.

In association with the front end, opposite sides, bottom end, and top end of the lamp 16, the aluminum lamp holder 166 has a front section 166a, side sections 166b, bottom section 166c, and top section 166d, all formed integral to each other. These sections are integrally formed by stamping a single aluminum plate with a die, and folding the respective sections along their boundaries. The top section 166d is formed at the upper edge of the front section 166a and connected thereto via narrow sections 166e, and can be folded at narrow sections 166e. Therefore, the lamp 16 can be inserted into the aluminum lamp holder 166 from above before the top section 166d is folded. By folding the top section 166d until its front edge is fit in the mounting slot (not shown), the lamp 16 can be correctly positioned and firmly fixed in the aluminum lamp holder 166.

Formed on each side edge of the top section 166d of the aluminum lamp holder 166 is a locking piece 166g folded downward and having at the tip thereof an inwardly protruding locking pawl 166f. Formed in the top sections of the opposite sides of the resin lamp holder 167 are engagement holes 167a to be engaged with the locking pawls 166f of the aluminum lamp holder 166. Thus, by inserting the aluminum lamp holder 166 having the lamp 16 mounted thereon on the resin lamp holder 167 from above and fitting the lower end of the lamp holder 166 in the mounting slot (not shown) formed in the bottom of the resin lamp holder 167, and by resiliently engaging the locking pawls 166f formed on the opposite sides of the top section 166d of the aluminum lamp holder 166 with the respective engagement holes 167a formed in the top sections of the opposite sides of the resin lamp holder 167, the lamp 16 can be firmly fixed at an optically correct position in the resin lamp holder 167. The lamp 16 thus fitted in the resin lamp holder 167 can be removably installed in the light source housing 49 through an opening (not shown) formed in the backside of the lower case 2b shown in FIG. 1.

It is noted that, as described above, the aluminum lamp holder 166 has the ventilatory net 168 that has a plurality of small holes in association with the exhaust port 165 and the air intake port 164 formed adjacent the front opening of the reflector 162.

In this arrangement, therefore, the heat emitted from the lamp 16 is efficiently dissipated from the aluminum lamp holder 166 into the air sent from the air intake fan 12, which implies that the heat is less likely to be transmitted to the resin lamp holder 167. Hence, the temperature of the resin lamp holder 167 can be suppressed without supplying a large amount of power to the air intake fan 12. Fan noise is reduced accordingly.

Further, since the aluminum lamp holder 166 has an integrally formed front section 166a, side sections 166b, bottom section 166c, and top section 166d, in association with the front end, opposite sides, bottom end, and top end of the lamp 16 as described above, heat is well transmitted from the lamp 16 to the aluminum lamp holder and effectively dissipated therefrom.

In addition, as described above, since top section 166d is formed at the upper edge of the front section 166a and connected thereto via narrow sections 166e, and can be folded at narrow sections 166e, and since the lamp 16 can be inserted into the aluminum lamp holder 166 from above before the top section 166d is folded, the lamp 16 is correctly positioned and firmly fixed in the aluminum lamp holder 166.

Also, since the aluminum lamp holder 166 is provided, at the opposite side edges of the top section 166d thereof, with the locking pieces 166g that is folded downward at the opposite side edges of the top section 166d of the lamp holder 166 and is provided at the tips thereof with inwardly protruding locking pawls 166f, and since the engagement holes 167a are formed in the opposite sides of top section of the resin lamp holder 167 to be engaged with the locking pawls 166f of the aluminum lamp holder 166, the aluminum lamp holder 166 having the lamp 16 positioned and fixed thereon can be mounted on the resin lamp holder 167 and then the locking pawls 166f of the aluminum lamp holder 166 can be engaged with the respective engagement holes 167a of the resin lamp holder 167. Thus, the aluminum lamp holder 166 now having the lamp 16 installed thereon can be correctly positioned and fixed on the resin lamp holder 167. By mounting this resin lamp holder 167 in the light source housing 49, the lamp 16 can be positioned, and firmly fixed, at the optically correct position.

Since the aluminum lamp holder 166 has the ventilatory net 168 that has a plurality of small holes in association with the exhaust port 165 and the air intake port 164 formed adjacent the front opening of the reflector 162, the aluminum lamp holder 166 can prevent the debris of a ruptured luminous tube 161 from scattering if the luminous tube 161 is ruptured.

In this way, utilizing a lamp cooling mechanism capable of efficiently reducing the temperature of the resin lamp holder 167 and the noise of the fan without supplying a large amount of power to the air intake fan 12 in accordance with the embodiment described above, a liquid crystal projector 1 having an enhance light source can be constructed in a compact and light weight configuration.

Figure 12:
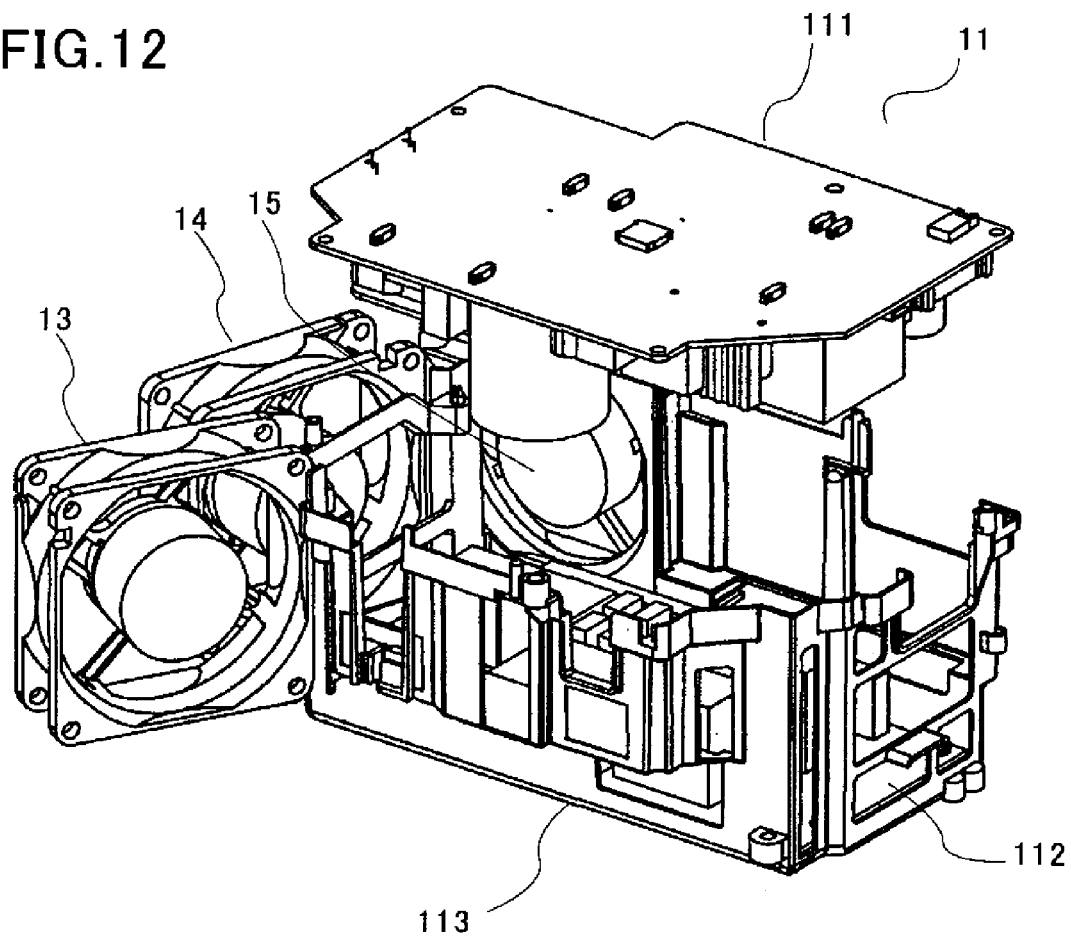
FIG. 12 is an exploded perspective view of a power supply cooling mechanism in accordance with one embodiment of the invention.
Figure 13:
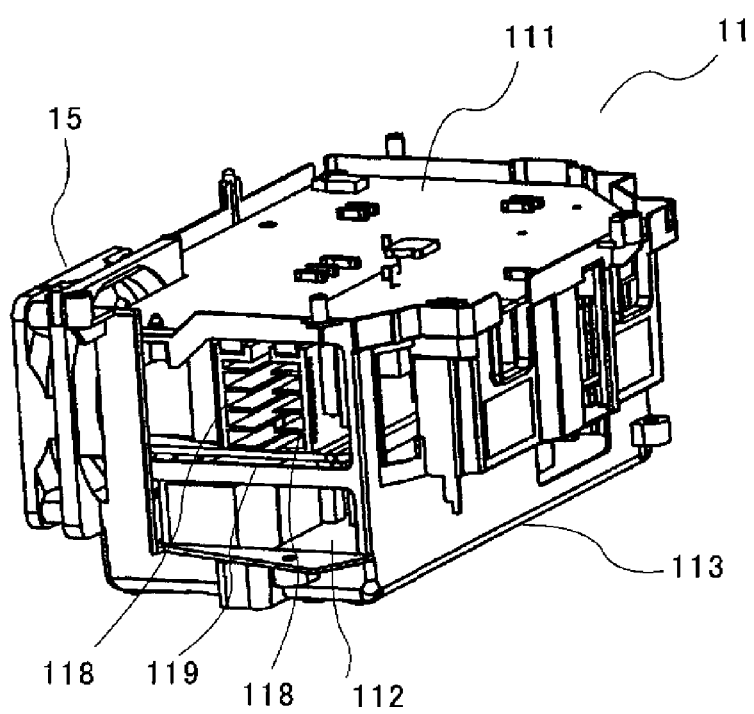
FIG. 13 is a perspective view of the power supply unit mounted on a power supply holder.
Figure 14:
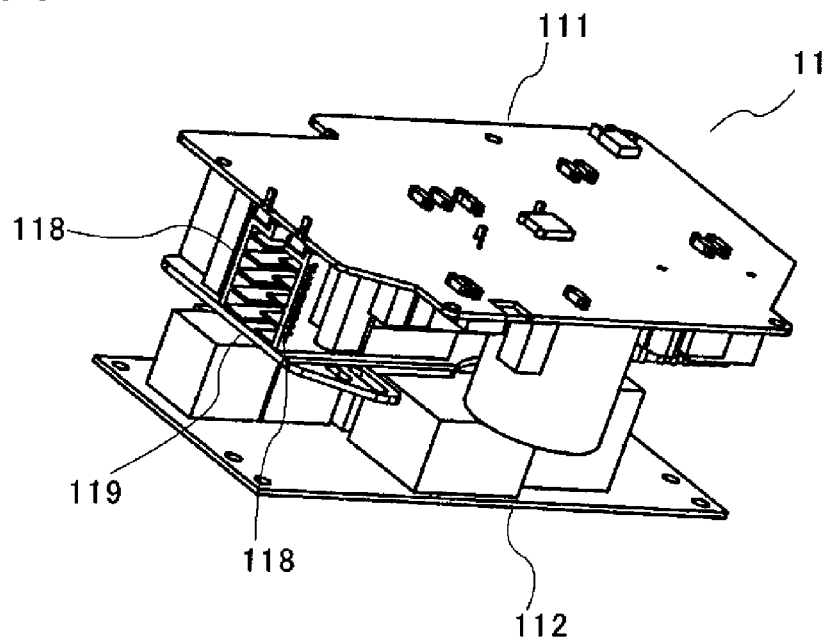
FIG. 14 is a perspective view of the power supply unit with the power supply holder removed.
Figure 15:
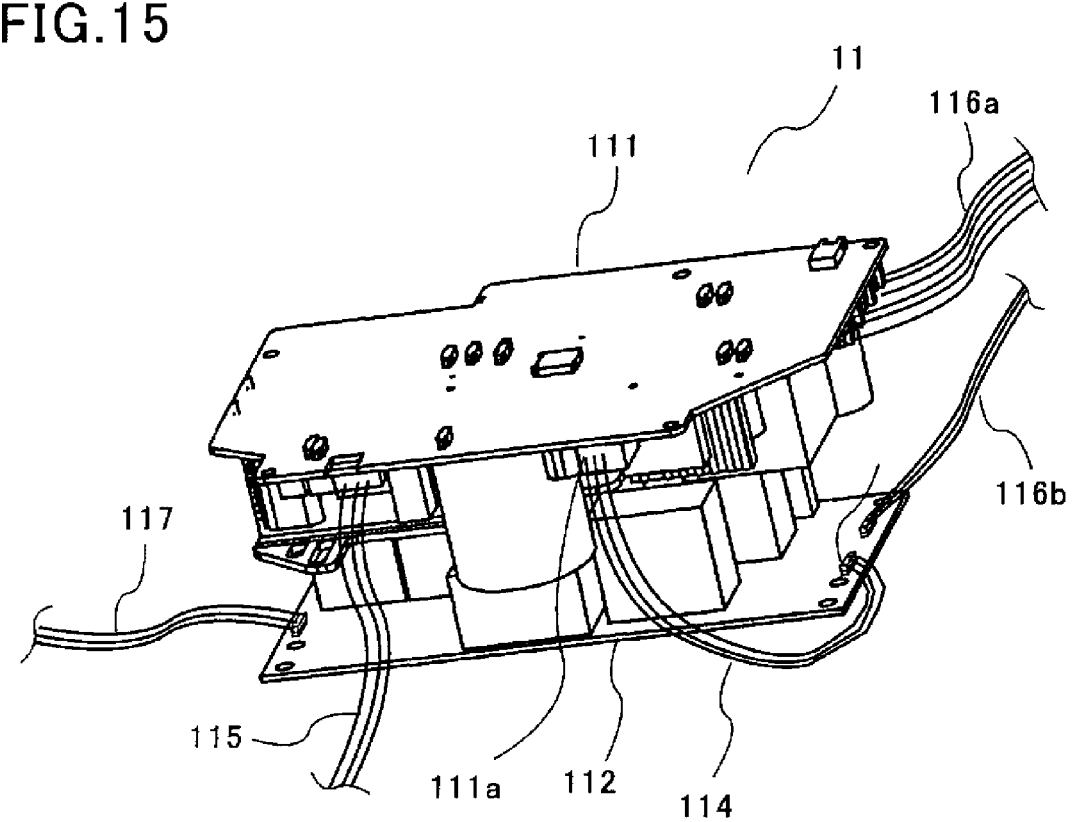
FIG. 15 is a perspective view of the power supply unit as viewed from another direction, with the power supply holder removed.

Referring to FIGS. 12 through 15, there is shown a power supply cooling mechanism in accordance with one embodiment of the invention. More particularly, FIG. 12 shows in exploded perspective view a power supply unit, and FIG. 13 through 15 show in perspective view the power supply unit 11 mounted on a power supply holder, the power supply unit 11 alone, and the power supply unit 11 as viewed from a different angle, with the holder removed to show lead wires.

The power supply unit 11 includes a power supply circuit board 111 equipped with circuit elements for supplying electric power to the components other than the lamp 16, and a ballast circuit board 112 having circuit elements for supplying electric power to the lamp 16. Each of the circuit boards 111 and 112 has their circuit elements mounted on one side (referred to as element mounting side) and the two circuit boards 111 and 112 are arranged on a power supply holder 113 in such a way that their element mounting sides face each other with a space in between them to allow cooling air sent from exhaust fans 14 and 15 to flow through the space.

In a conventional power supply unit, lead wires connecting the power supply circuit board and the ballast circuit board are placed between the two circuit boards, hindering cooling of the circuit elements and heat radiators on the boards by the cooling air from fans. Moreover, the lead wires extending between the circuit boards develop adverse effects, e.g. electric oscillations in the power supply unit caused by magnetic fields, which have adverse influences on the performance of the power supply unit. Furthermore, assembling the circuit boards requires special care not to have the lead wires pinched between the circuit boards.

In the embodiment shown, therefore, electric connectors 111a and 112a of the power supply circuit board 111 and the ballast circuit board 112 are provided on the peripheries of the respective boards, as shown in FIG. 15, and the lead wires connecting them are provided outside the space between the two circuit boards 111 and 112. It should be understood that the power supply holder 113 shown in FIGS. 12 and 13 is not shown in FIG. 15 for ease of illustration of the lead wires, in actuality the lead wires 114 are wired outside the power supply holder 113.

Connected to the power supply circuit board 111 are lead wires 115 for supplying AC power to the power supply circuit board 111 and lead wires 116a connected to a main control board (not shown). Lead wires 117 for supplying electric power to the lamp 16 and lead wires 116b connected to the main control board are connected to the ballast circuit board 112. These lead wires 115-117 are also extended out of the space between the circuit boards 111 and 112, and arranged outside the power supply holder 113.

On the other hand, two heat sinks 118 are mounted on the element mounting side of the power supply circuit board 111, as shown in FIGS. 13 and 14. Each of the heat sinks has mutually opposing fins and an aluminum heat radiating plate 119 provided at the lower end of the sink. The exhaust fans 14 and 15 are arranged such that one of them is offset sideways from the heat radiating plate 119, and another lies on the extension of the heat radiating plate 119.

In this arrangement, the streams of cooling air generated by the exhaust fans 14 and 15 can flow without being hindered by lead wires. As a consequence, the cooling efficiency and electric performance of the power supply circuit and ballast circuit are improved. In addition, this arrangement solve the problem of pinching lead wires during assembly, thereby rendering the power supply unit and ballast circuit easy to assemble.

Since the lead wires 114-117 are placed outside the power supply holder 13, no lead wire will never pinched between the circuit boards 111 and 112, thereby bringing about the above described merits.

Because of the heat radiating plate 119 arranged on the power supply circuit board 111, the stream of cooling air is not disrupted by lead wires connected to the heat radiating plate 119. As a consequence, an improved cooling air stream to the heat radiating plat 119 is established, which contributes to the cooling of the power supply circuit.

Since one of the exhaust fans 14 and 15 lies in the direction of the extension of the heat radiating plate 119 while the other one off that direction, the cooling wind from the fans are intensively blown to the heat radiating plate 119 without being blocked by a lead wire, thereby cooling the heat radiating plate 119 more efficiently.

In this way, the invention enables realization of a liquid crystal projector 1 equipped with a power supply circuit cooling mechanism in accordance with the embodiment as described above that can: perform efficient cooling of the power supply circuit and a ballast circuit; provide the power supply unit improved electric performance; and exclude problematic pinching of lead wires and allow assembling the power supply circuit in a simple manner.

Figure 16:
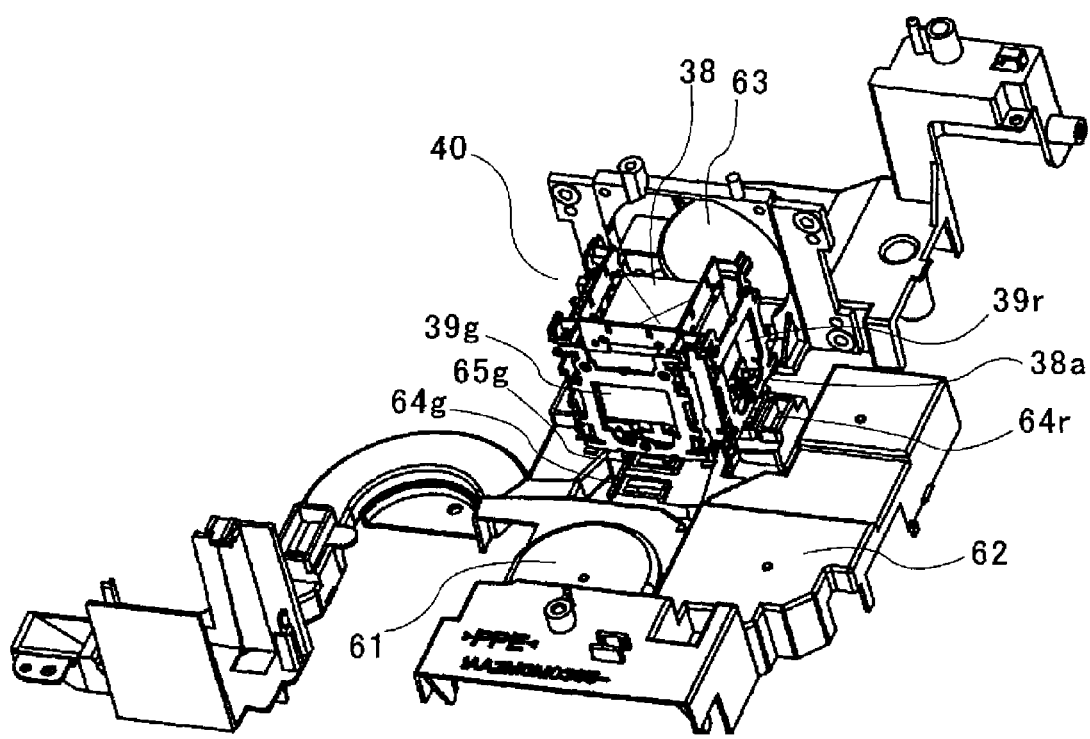
FIG. 16 is a perspective view of an optical panel cooling mechanism in accordance with one embodiment of the invention, with a prism assembly mounted thereon.
Figure 17:
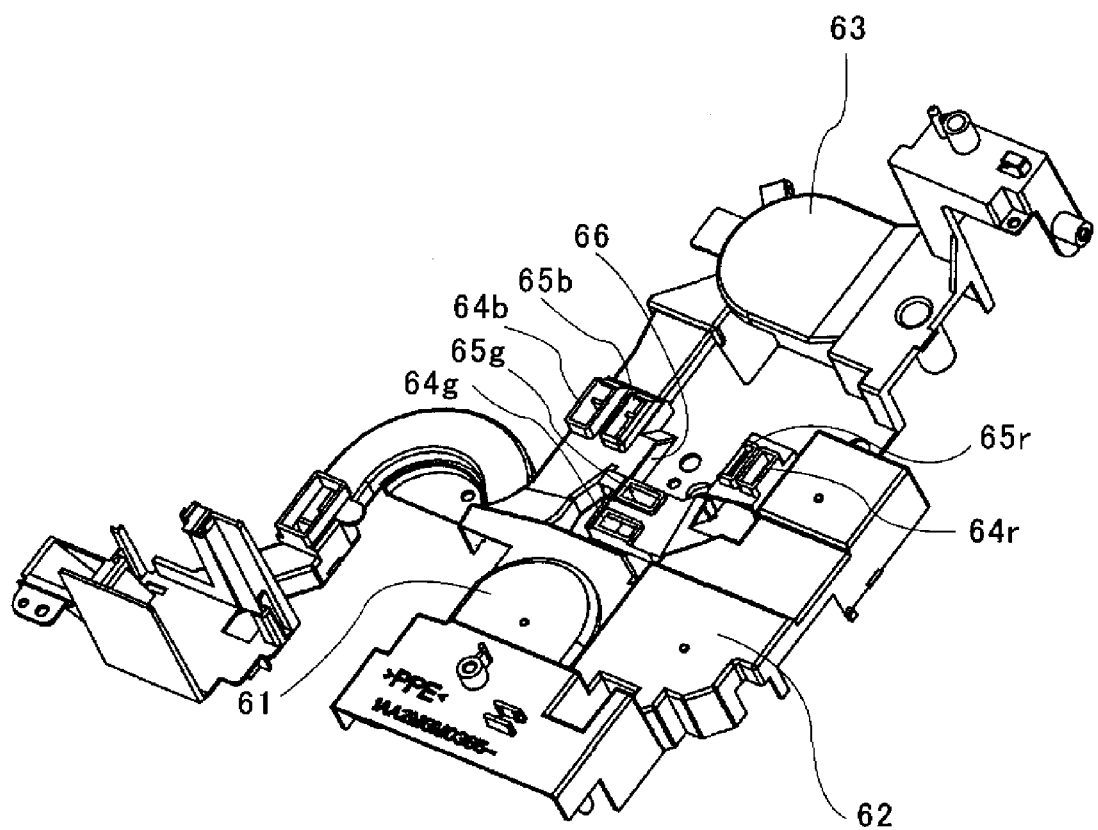
FIG. 17 is a perspective view of the optical panel cooling mechanism, with the prism assembly removed therefrom to show an air outlet associated with the prism assembly.

Referring to FIGS. 16 and 17, there is shown in perspective view an optical panel cooling mechanism in accordance with one embodiment of the invention. More particularly, FIG. 16 shows the optical panel cooling mechanism with a prism assembly 40 mounted thereon, and FIG. 17 shows the optical panel cooling mechanism with the prism assembly 40 dismounted therefrom to clearly show air outlets of the optical panel cooling mechanism.

Conventionally, cooling of optical panels, such as LCPs and polarization plate, mounted on the respective sides of a color composition prism, is effected by directly blowing the air sent from a fan to the optical panels to be cooled via air outlets. In a projection type image display apparatus such as a liquid crystal projector, however, its optical panels including the LCPs and polarization plates cannot be cooled sufficiently by simply blowing air to them, due to the fact that such image display apparatus now utilizes a high-intensity (i.e. high-output) light source.

The invention, therefore, provides the prism assembly 40 with a set of first air outlets 64r, 64g, 64b, 65r, 65g, and 65b for directly blowing air delivered from three air intake fans 61, 62, and 63 to the light entering sides (via air outlets 64r, 64g, and 64b) and the light emerging sides (via air outlets 65r, 65g, and 65b) of the LCPs 39r, 39g, and 39b, and a second air outlet 66 for blowing air delivered from an air intake fan 61 to the color prism 38 and to the aluminum base 38a on which the color prism 38 is mounted.

The first air intake fan 61 is primarily associated with the air outlet 64b on the light entering side of the LCP 39b for blue light (the LCP hereinafter referred to as B-LCP 39b) and air outlet 65b on the light entering side of the B-LCP 39b. The second air inlet fan 62 is primarily associated with the air outlet 64g on light entering side of the LCP 39g for green light (the LCP hereinafter referred to as G-LCP 39g) and the air outlet on the light emerging side of the G-LCP 39g. The third air inlet fan 63 is primarily associated with air outlet 64r on the light entering side of the LCP 39r for red light (the LCP hereinafter referred to as R-LCP) and the air outlet 65r on the light emerging side of the G-LCP 39g. Moreover, since the blast power of the first air intake fan 61 is largest (approximately twice the blast powers of the second and third fans), the air from the first air intake fan 61 is bifurcated to the second air outlet 66. Incidentally, since the first air intake fan 61 is also used to cool a polarization beam splitter as described later, the air from the third air intake fan 63 is also supplied to the air outlet 64b and 65b on the light entering and emerging sides, respectively, of the B-LCP 39b.

It is noted that in the arrangement the LCPs 39r, 39g, and 39b and polarization plates are cooled directly by blown air and further cooled indirectly via the color composition prism 38 and its base 38b, which promotes cooling of the LCPs 39r, 39g, and 39b and polarization plates. Since the cooling of the LCPs 39r, 39g, and 39b and the polarization plates is improved in this manner, they will have better performance and longer lives.

It is also noted that by directly blowing air to the light entering side and light emerging side of the respective LCPs 39r, 39g, and 39b, both sides of the respective LCPs 39r, 39g, and 39b as well as the polarization plates arranged on both sides of these LCPs are cooled efficiently, not only directly but also indirectly through the excellent heat radiating base 38a of aluminum, Thus, improved cooling of the LCPs 39r, 39g, and 39b and the polarization plates on both sides of these LCPs is achieved.

Since three air intake fans 61-63 are provided in association mainly with the air outlets 64r, 64g, and 64b on the light entering side and air outlets 65r, 65g, and 65b on the light emerging side of the LCPs 39r, 39g, and 39b in such a way that the air blown by the first air intake fan 61 having the largest blast power is bifurcated to the second air outlet 66, cost-effective and space-saving yet efficient cooling of the optical panels can be achieved without increasing the number of air intake fans more than two.

Thus, a liquid crystal projector having well cooled optical panels including LCPs 39r, 39g, and 39b and the polarization plates can be realized using an optical panel cooling mechanism in accordance with the embodiment described above.

Figure 18:
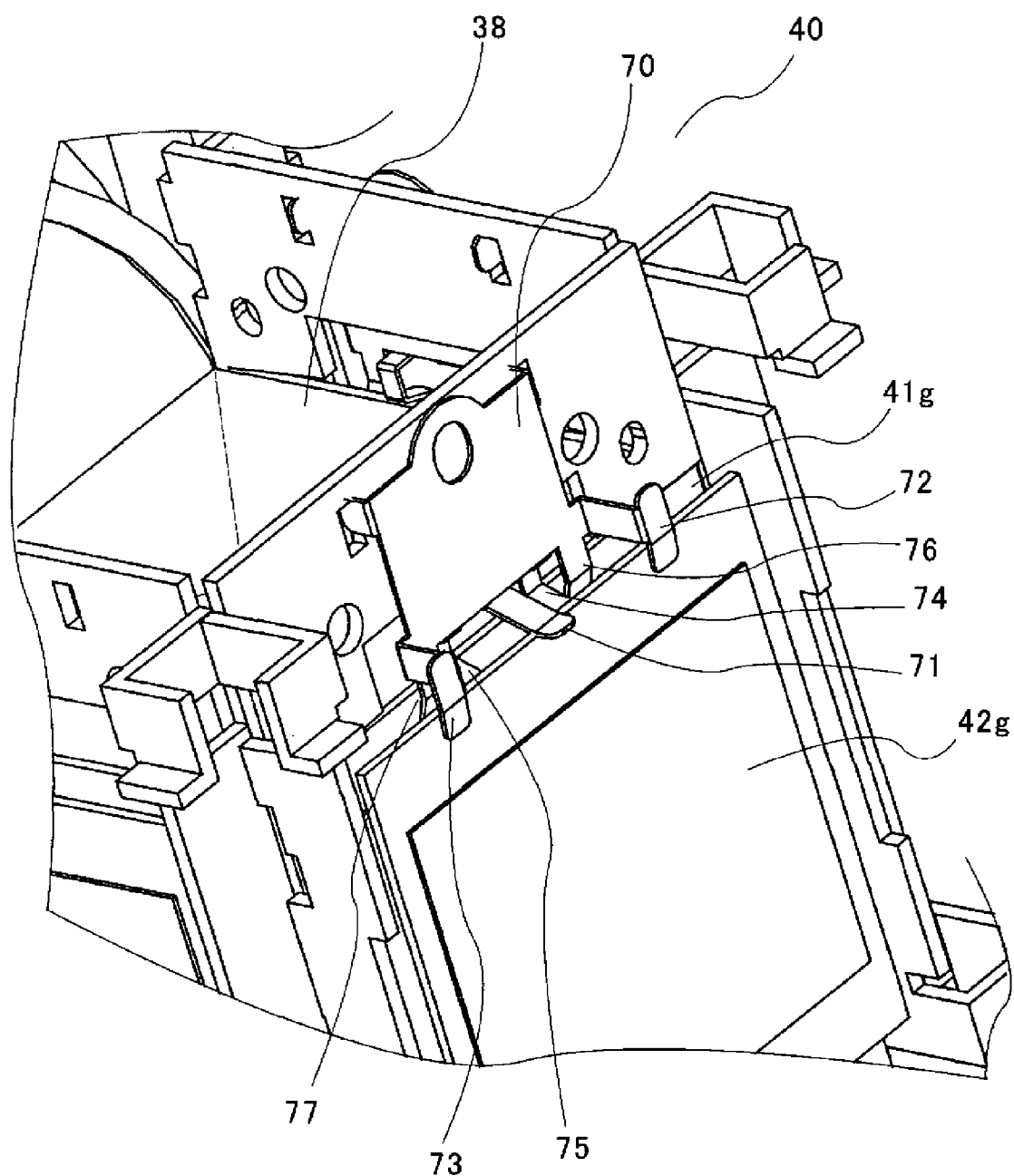
FIG. 18 is an enlarged perspective view of a relevant section of an optical panel mounting mechanism in accordance with one embodiment of the invention.

Referring to FIG. 18, there is shown in enlarged perspective view a relevant section of an optical panel mounting mechanism in accordance with one embodiment of the invention. More particularly, the FIG. 18 shows the optical panel mounting mechanism for mounting the polarization plate 41g and pre-stage polarization plate 42g arranged on the light emerging side of G-LCP 39g of the prism assembly 40. In order to clearly illustrate the structure of the mounting mechanism, G-LCP 39g is omitted in FIG. 18.

In some conventional prism assemblies polarization plates are glued on the light entering sides of a color composition prism with an adhesive, but then the maintenance and recycling of the color composition prism and polarization plates are difficult. If, in order to avoid such bonding, a clamp is provided on a mounting bracket 70 for mounting an optical panel and is used to resiliently push an optical panel such as a polarization plate in a vertical and a horizontal direction simultaneously, then a saccadic movement of the optical panel is inevitable due to the interference between the vertical and horizontal pushing forces. Such saccadic movement or displacement of the optical panel results in loss of the precision of the panel or non-uniform cooling of the optical panel, and hence variations in temperature in the panel, and resultant non-uniform expansion of the panel. Therefore, the saccadic movement results in displacements of the pixels of the optical panels, which degrade the quality of the image display apparatus.

In the embodiment shown, therefore, each mounting bracket 70 is provided with an elastic push member 71 for urging the pre-stage polarization plate 42g downward towards the mounting section (not shown) formed at the lower end of the of the pre-stage polarization plate 42g; separate push members 72 and 73 for resiliently pushing the polarization plate 42g in a horizontal direction towards the mounting section (not shown) formed behind the polarization plate 42g; push members 74 and 75 for resiliently pushing the polarization plate 41g downward towards the mounting section (not shown) formed at the lower end of the polarization plate 41g; and push members 76 and 77 for resiliently pushing the polarization plate 41g in a horizontal direction towards the mounting section (not shown) formed behind the polarization plate 41g.

In this arrangement, the biasing forces urging the optical panel in the downward and horizontal directions will not interfere each other, so that the optical panel can be securely mounted on the mounting section without using glue. Thus, the invention prevents displacements of pixels due to, for example, variations in temperature in, and/or loss of position accuracy of, the optical panels and ensure the quality of the image display apparatus.

It is noted that both of the pre-stage polarization plate 42g and polarization plate 41g can be securely mounted by means of single mounting bracket 70, without using glue, thereby achieving the above described result at low cost.

It is also noted that the arrangement of the polarization plates, being mounted on the light entering side of the color composition prism 38, facilitates maintenance and/or recycle of the color composition prism and polarization plates.

Thus, a high-quality liquid crystal projector can be realized utilizing an optical panel mounting mechanism capable of securely and accurately mounting optical panels including polarization plates, without using glue, in accordance with the embodiment described above.

Figure 19:
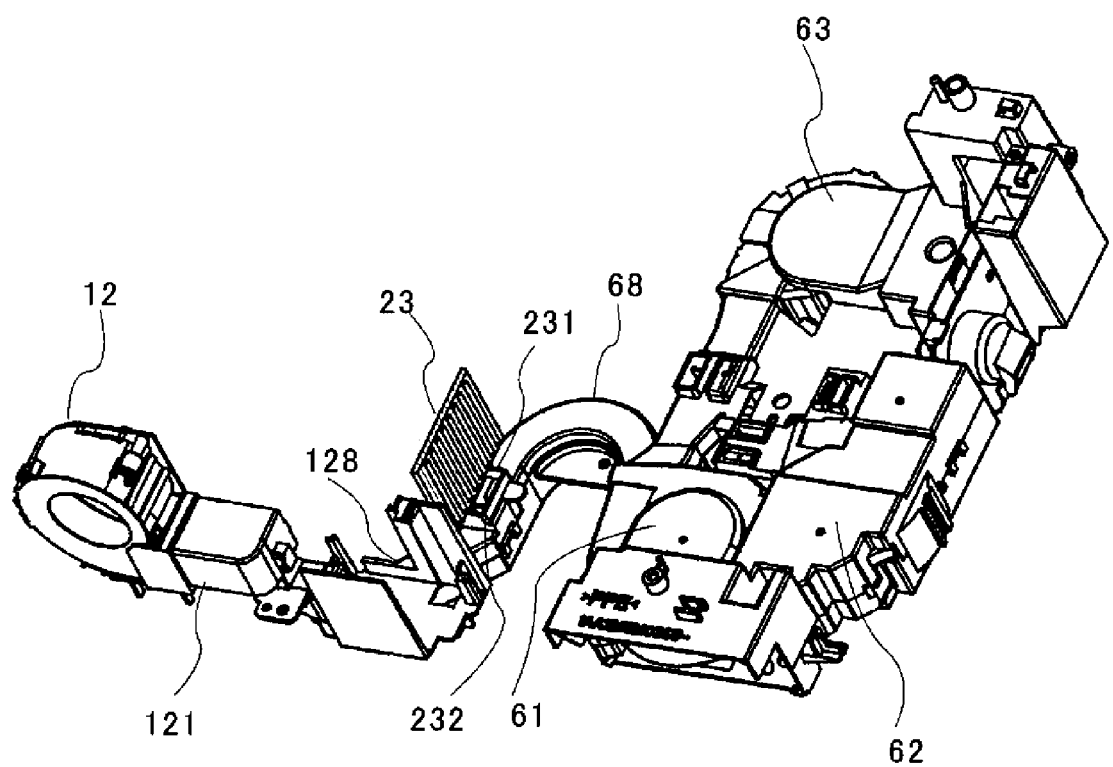
FIG. 19 is a perspective view of another optical panel cooling mechanism in accordance with another embodiment of the invention.
Figure 20:
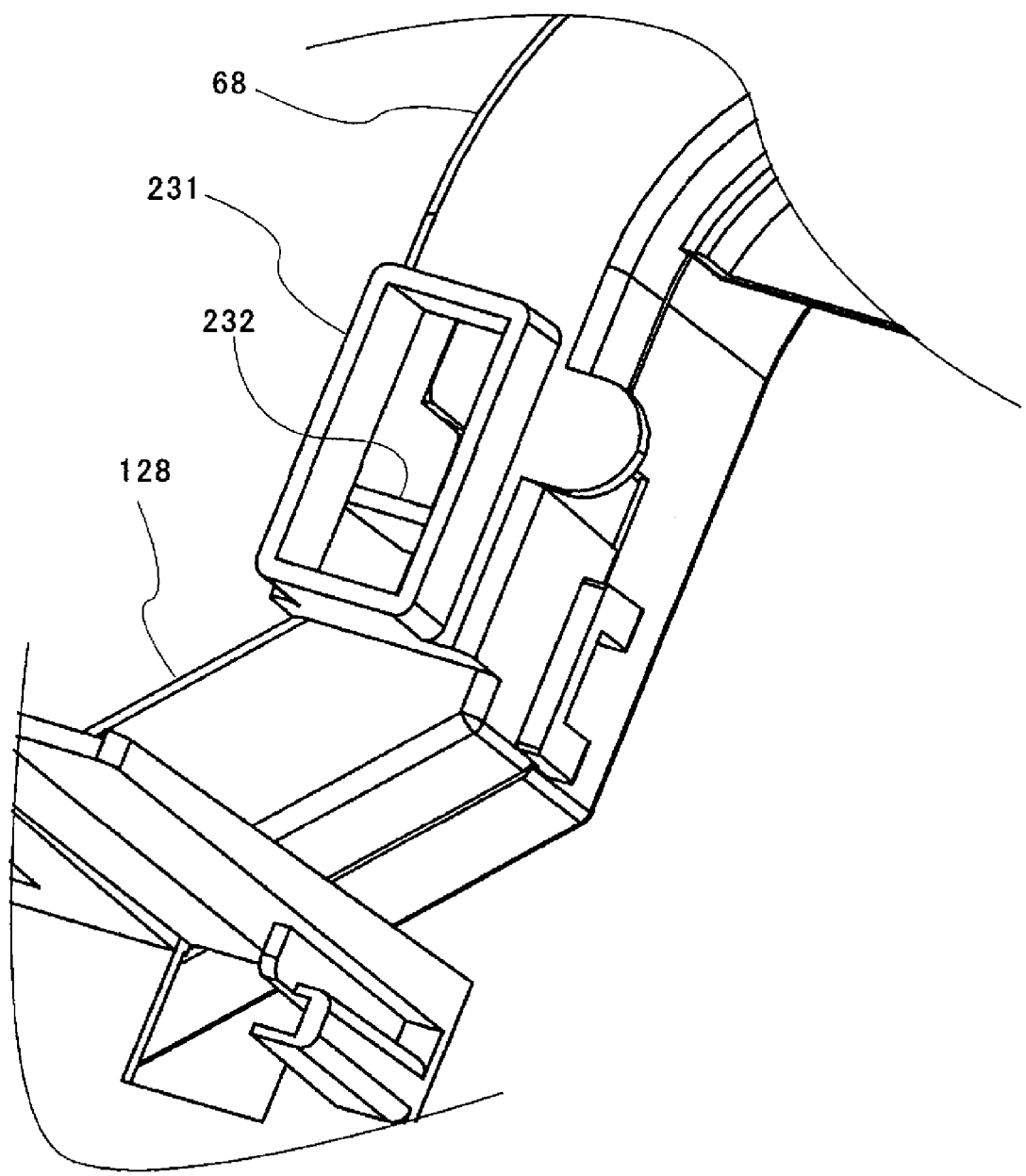
FIG. 20 is an enlarged view of the optical panel cooling mechanism, with a polarization beam splitter removed.
Figure 21:
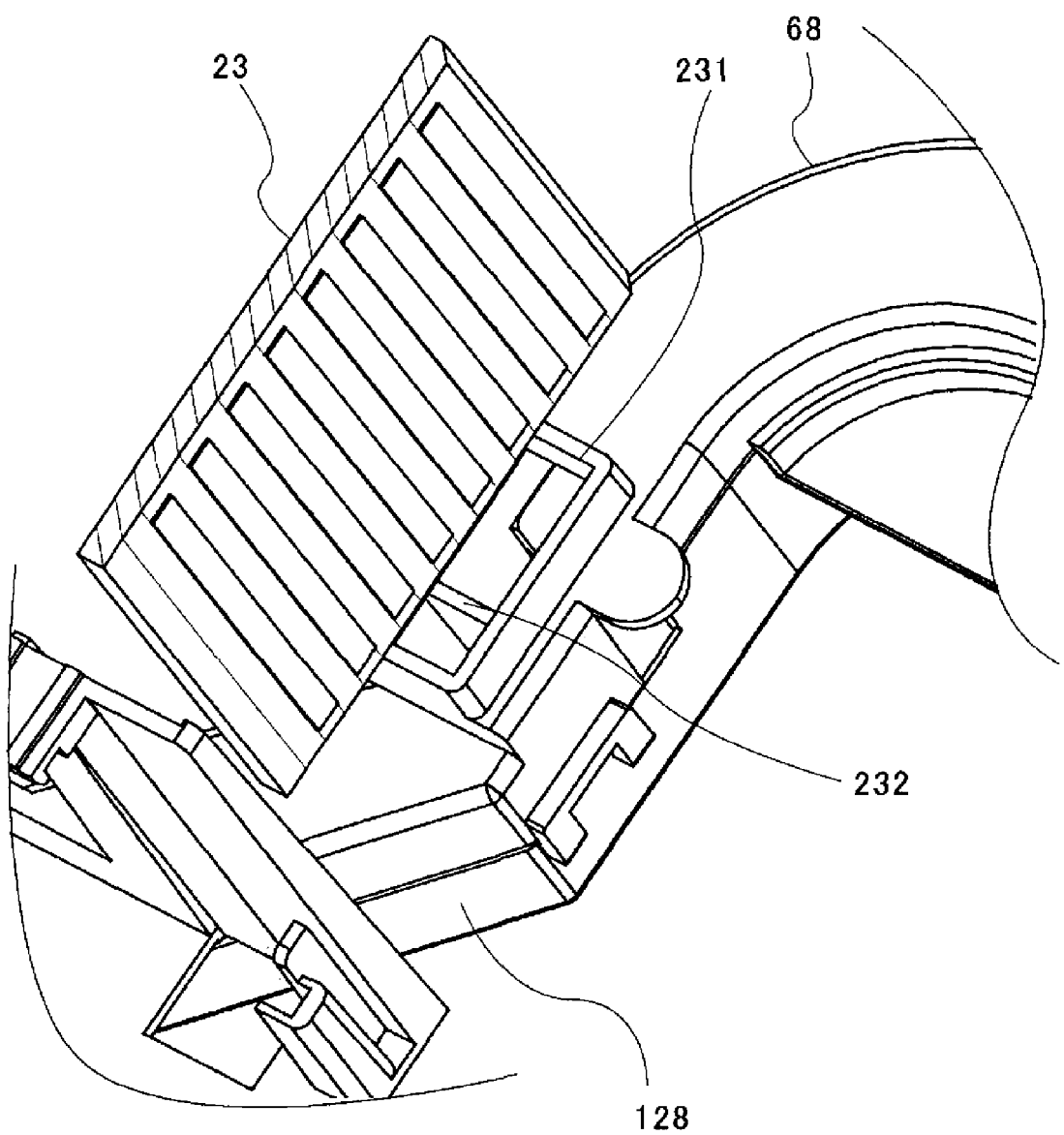
FIG. 21 is an enlarged view of the optical panel cooling mechanism, with a polarization beam splitter mounted.

Referring to FIGS. 19 through 21, there is shown an optical panel cooling mechanism in accordance with another embodiment of the invention. More particularly, FIG. 19 is an overall perspective view of the PBS cooling mechanism; FIG. 20 is an enlarged view of a relevant section of the cooling mechanism with the PBS omitted; and FIG. 21 is another enlarged view of the cooling mechanism with the PBS mounted.

Conventionally, cooling of these optical panels is effected by directly blowing the air sent from a fan and out of air outlets to the optical panels to be cooled. In a projection type image display apparatus such as a liquid crystal projector, however, its optical panels including a polarization beam splitter cannot be cooled sufficiently by simply blowing air to them, due to the fact that such image display apparatus now utilizes a high-intensity (i.e. high-output) light source. One way to solve this problem is to maximize the blast power (or rotational speed) of the fan. But this causes the fan noise to increase.

In the embodiment of the invention, therefore, there is provided an air outlet 231 for blowing air sent from two air intake fans 12 and 61 to the PBS 23. The air outlet is provided with a partitioning plate 232 for partitioning the stream of air coming out of the air intake fans 12 and 61.

The partitioning plate 232 is located in the air outlet 231 in such a way that it partitions the cross section of the outlet 231 in the ratio proportional to the amounts of air delivered from the respective fans 12 and 61. In the example shown herein, the amount of air sent from the air intake fan 61 for cooling the B-LCP 39b and discharged through a duct 68 is twice as much as the amount of air sent from the air intake fan 12 through the duct 121 (sending air to the lamp 16) and discharged through a bifurcated duct 128. In correspondence with this ratio, the cross section of the air outlet 231 is partitioned by the partitioning plate 232 to the same ratio, i.e. 1:2, as shown in FIGS. 20 and 21.

The partitioning plate 232 extends inside the air outlet 231, offset back from the open end of the air outlet 231, as shown in FIG. 20.

With the partitioning plate 232 so configured as described above, the air sent from the respective air intake fans 12 and 61 merges in the air outlet 231 so that the air is blown uniformly to the entire area of the PBS 23, enhancing the cooling of the PBS 232 without maximizing the air blast power (or rotational speed) of the air intake fans 12 and 61. The fan noise is reduced accordingly.

In view of the fact that the PBS 23 tends to lose its performance as optical panel and gets deteriorated when it is heated, the cooling mechanism that can efficiently cool the PBS 23 in this way will improve its performance and extends its life.

It is noted that since the partitioning plate 232 is adapted to partition the cross section of the air outlet 231 with the same ratio as the that of the blast powers of the air intake fans 12 and 61, the PBS 23 can be cooled uniformly by the air discharged from the air outlet 232.

It will be appreciated that this cooling mechanism can be obtained in a simple manner by the use of two air intake fans 12 and 61 and the air outlet 231 having partitioning panel 232 for partitioning the air flows from two air intake fans 12 and 61, and yet the mechanism can achieve the result as described above.

It is noted that since the partitioning plate 232 is offset back from the open end of the air outlet 231, it can prevent the stream of air sent from the air intake fans 12 and 61 from being split.

Thus, in accordance with the embodiment as described above, a liquid crystal projector 1, equipped with an optical panel cooling mechanism capable of better cooling the PSB 23 with a reduced noise level, can be realized.

Figure 22:
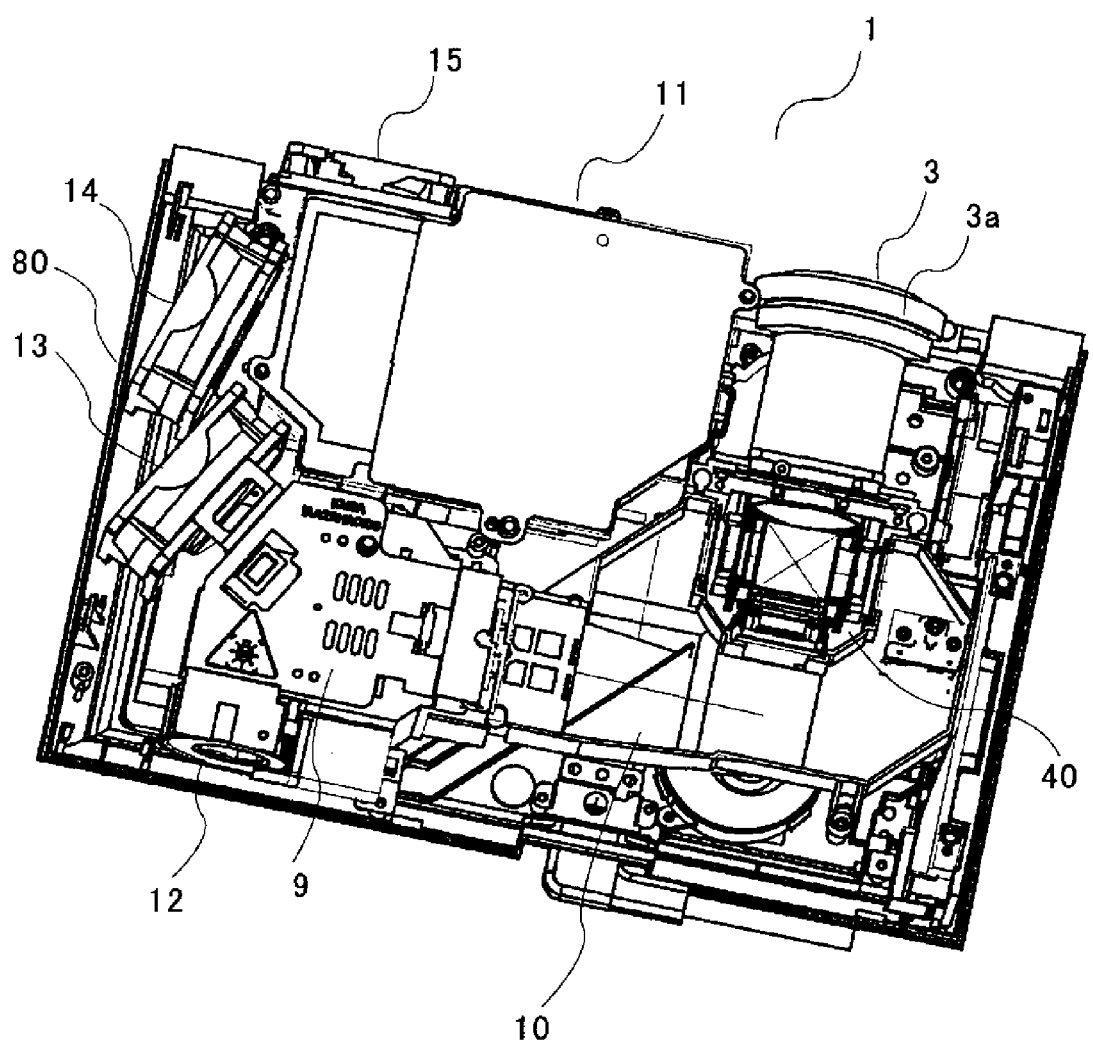
FIG. 22 is an overall plan view of the exhaust mechanism in accordance with the embodiment of the invention.
Figure 23:
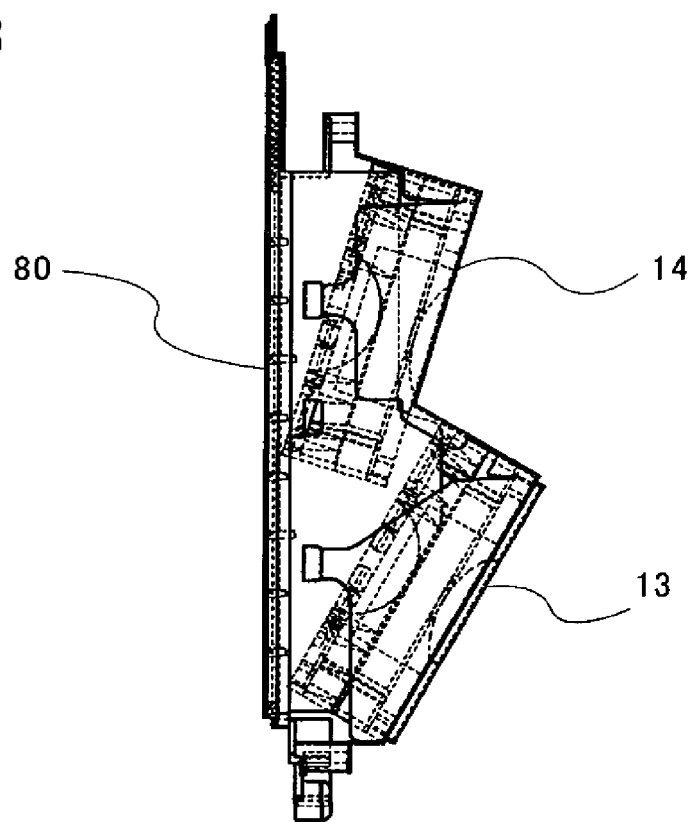
FIG. 23 is a plan view of a relevant section of the exhaust mechanism.
Figure 24:
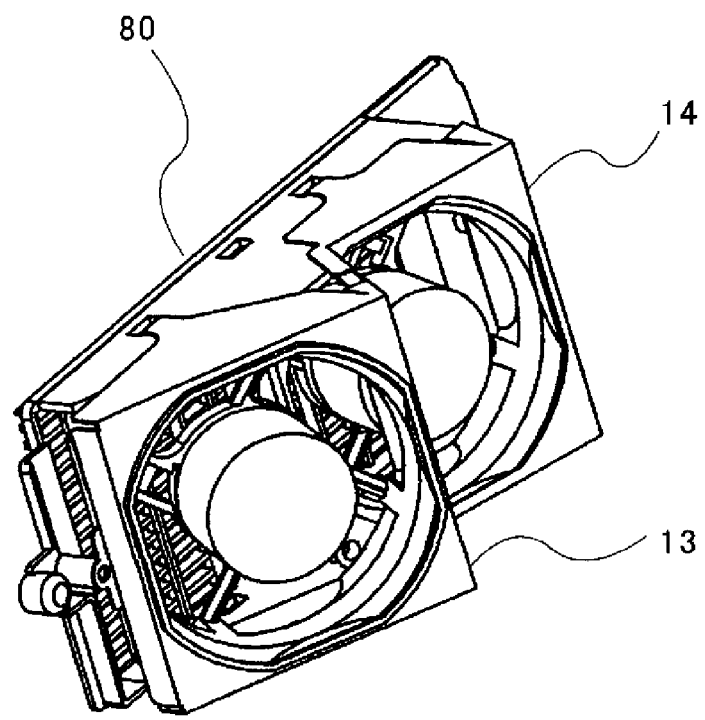
FIG. 24 is a perspective view of the relevant section of the exhaust mechanism.

Referring to FIGS. 22 through 24, there is shown an exhaust mechanism in accordance with one embodiment of the invention. More particularly, FIG. 22 shows an overall view of the exhaust mechanism, FIG. 23 a top view of a relevant section of the exhaust mechanism, and FIG. 23 a perspective view of the relevant section of the exhaust mechanism.

A typical conventional projection type image display apparatus such as a liquid crystal projector has a light source unit that becomes heated to a higher temperature than a power supply unit, wherein the light source unit is cooled by an exhaust fan running at the maximum blast power (or maximum rotational speed), a large exhaust fan, or by a multiplicity of exhaust fans. Some image display apparatuses have two exhaust fans adjoined together.

However, fan noise will become large if the blast power (or rotational speed) of the exhaust fan is raised to its maximum level. If, on the other hand, a larger fan is used or more than one fan are used, a larger installation space will be needed for the fan(s), so that the dimensions of the image display apparatus must be disadvantageously increased.

As stated previously, recent projection type image display apparatuses such as a liquid crystal projector are demanded on one hand to be compact in size and on the other hand have a high-power light source. However, under conventional technology, simultaneous reduction of the noise level and the internal temperature of the image display apparatus, and hence the temperature of the exhaust air, is becoming increasingly difficult.

In the embodiment shown herein, therefore, there are provided a first exhaust fan 13 for primarily exhausting air from the light source unit 9 and a second fan for primarily exhausting air from the power supply unit 11 such that the first exhaust fan 13 is arranged to partly overlap the second exhaust fan 14.

Further, the first and second fans 13 and 14, respectively, are oriented so as to discharge exhaust air, from an exhaust port 80 formed in one side wall, in a forward oblique direction The blast power of the second exhaust fan 14 is set smaller than that of the first fan 13.

In this arrangement, hot air exhausted from the light source unit 9 is mainly discharged by the first exhaust fan 13 to the outside of the image display apparatus, but partly inspired into the second exhaust fan 14 and then discharged therefrom to the outside.

Thus, exhaustion of the hottest air from the light source unit 9, where the temperature is highest in the image display apparatus, can be facilitated by forcibly distributing the air over the two overlapping fans, without employing a larger exhaust fan or maximizing the blast power (rotational speed) of an exhaust fan used. Accordingly, the temperature of the air inside the image display apparatus, and hence the temperature of the exhaust air, can be efficiently reduced. At the same time, the fan noise can be reduced. As a result, uprating of power of the light source unit 9 and downsizing of an image display apparatus can be simultaneously achieved.

The second exhaust fan 14 is adapted to exhaust air from the power supply unit 9 via the first exhaust fan 13, and simultaneously from the power supply unit 11 as well, though the power supply unit 11 is not as hot as the light source unit 9.

In addition, by arranging the first and second fan 13 and 14, respectively, at angles with respect to the exhaust port 80, portions of the fans in immediate proximity to the exhaust port 80 can be lessened and the noise of the two fans can be reduced by just that amount lessened.

Further, since the first and second exhaust fans are arranged so as to discharge exhaust air in a forward oblique direction with respect to the exhaust port 80 formed in the side wall, high-temperature exhaust air is prevented from being discharged towards the operator of the apparatus.

As the second exhaust fan 14 has a smaller blast power than the first exhaust fan 13, a pressure difference is generated across the two fans that facilitates the hot exhaust air to drift from the first exhaust fan 13 to the second exhaust fan 14.

Thus, a compact liquid crystal projector having a high-power light source can be realized using the exhaust mechanism capable of efficiently cooling the interior of the projector, and hence the temperature of its exhaust air, and reducing its fan noise in accordance with the embodiment as describe above.

Figure 25:
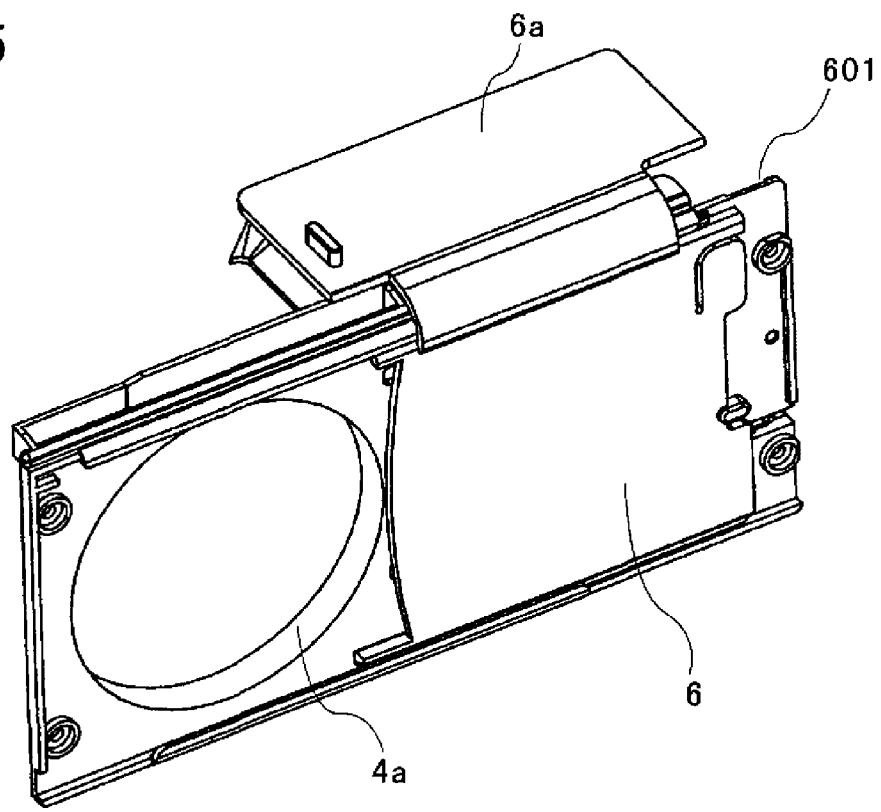
FIG. 25 is a perspective view of a lens cover slide mechanism in accordance with one embodiment of the invention as viewed from a front side thereof, with the lens cover opened.
Figure 26:
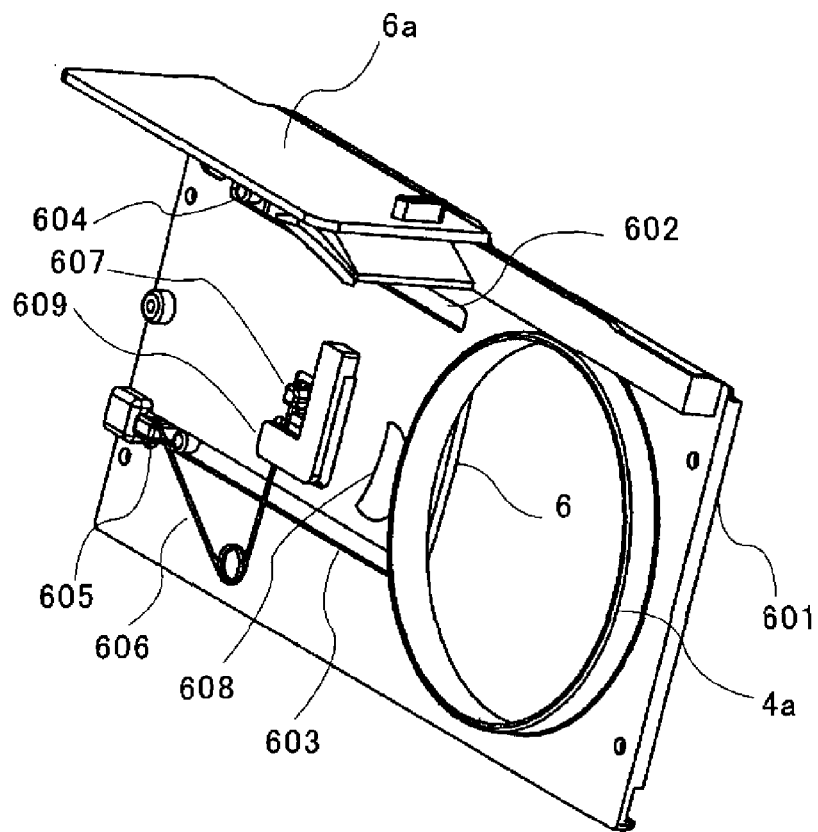
FIG. 26 is a perspective view of the lens cover slide mechanism as viewed from the back thereof, with the lens cover opened.

Referring to FIGS. 25 through 28, there are shown an arrangement and functions of a lens cover slide mechanism in accordance with one embodiment of the invention. More particularly, FIG. 25 shows in perspective view the lens cover mechanism as viewed from a front end of the imaging apparatus, with a lens cover 6 opened; and FIG. 26 is another perspective view as viewed from behind, with the lens cover 6 closed. FIGS. 28(a)-(f) illustrate functions of the lens cover slide mechanism.

A conventional manually operable lens cover is operable only by hand and can be opened to any degree between zero and full range by sliding it, and as it is, the lens cover stops where it is released. Therefore, such conventional lens cover has a drawback in that to close or open the lens cover it must be positively slid by hand all the way to the fully closed position or open position. The lens cover can be replace by a motor-driven cover, but it adds extra cost to the projector apparatus.

In this embodiment of the invention, therefore, the lens cover 6 is installed inside a front case 2c having a projection window 4 for exposing the projection lens 3, as shown in FIG. 1. Specifically, the lens cover 6 is supported by a holder plate 601 which is installed inside the front case 2c and has an opening 4a associated with the projection window 4. The holder plate is provided at the upper and lower ends thereof with two guide slots 602 and 603 arranged in parallel to each other, and on the backside thereof with guide protrusions 604 and 605 that can slide in the guide slits 602 and 603.

Figure 27:
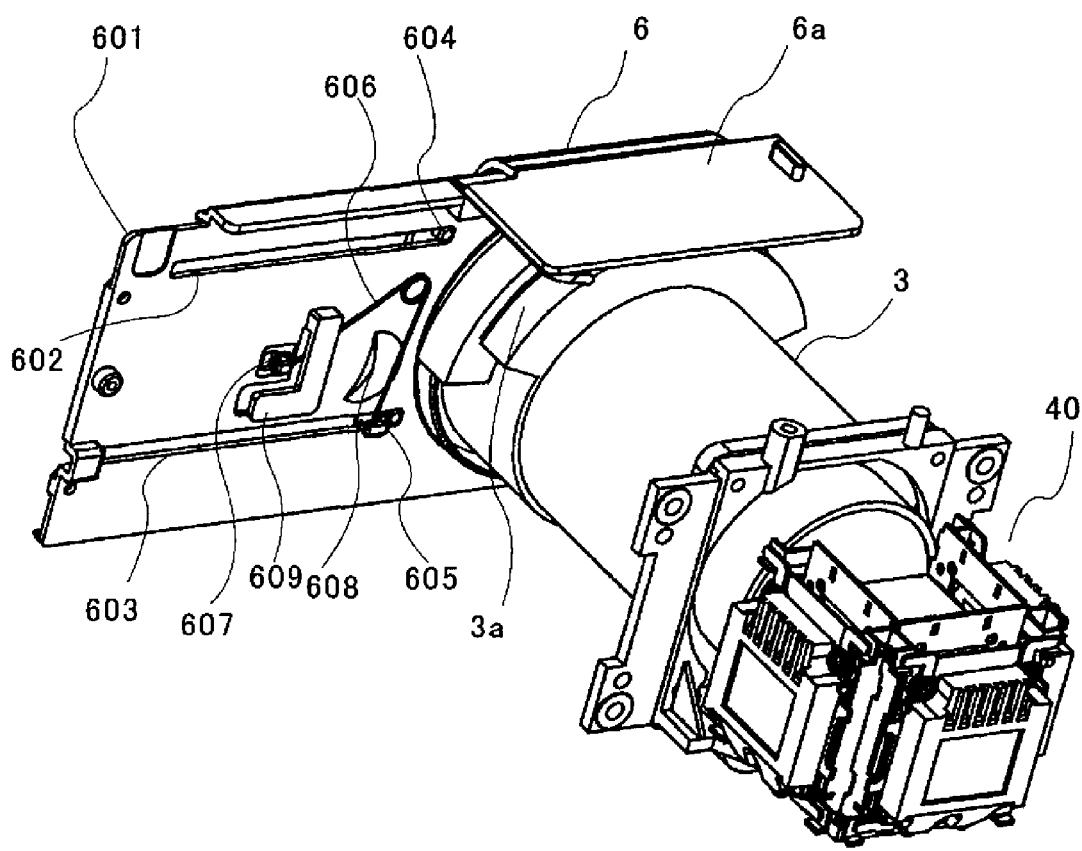
FIG. 27 is a perspective rear side view of the lens cover slide mechanism, with the lens cover closed.

A torsion spring 606 serving as a means for urging the holding plate 601 is mounted at one end thereof on the spring fixing section 607 formed substantially intermediate the two guide slits 602 and 603 on the backside of the holding plate 601, and, at the other end thereof, mounted on the guide protrusion 605 that can slide on the lower guide slit 603. Thus, a snap action mechanism is established by the torsion spring 606 that cause the lens cover 6 to be urged to either the fully closed position as shown in FIGS. 25 and 28(*a*) and (*b*) or fully open position as shown in FIGS. 27 and 28(*e*) and (*f*), depending on which side of the intermediate position shown in FIG. 28(*c*) and (*d*) the cover is located.

The holding plate 601 is also formed with an arched protrusion 608 substantially intermediate the fully closed position and the fully open position of the lens cover 6, on which protrusion one end of the torsion spring 606 can slide. The holding plate 601 is further formed with a push member 609 for pushing said one end of the torsion spring 606 against the arched protrusion 608.

The lens cover 6 has a cover section 6a, formed integral therewith, for covering an access window 7, through which an adjustment dial 3a can be accessed to control zooming and/or focusing of the projection lens 3.

In this arrangement, the lens cover 6 can be automatically slid to the fully closed or open position by the torsion spring 606 after it is moved halfway between the two positions. Thus, the arrangement can protect the projection lens 3 against dust for example, and enables realization of a cost effective and easy-to-handle lens cover slide mechanism.

Since the cover section 6a for covering the access window 7 through which an adjustment dial 3a can be accessed to control zooming and/or focusing of the projection lens 3 is formed integral with the lens cover 6, the adjustment dial 3a for controlling zooming and/or focusing of the projection lens 3 can be simultaneously protected from dust, together with the projection lens 3.

By installing the lens cover 6 inside the front case 2c having the projection window 4 for exposing the projection lens 3, guide section of the lens cover 6 for example is less likely to be barely exposed or to accumulate dust thereon. Thus, this arrangement enables realization of a lens cover slide adjustment mechanism that has a good exterior appearance and good maintenance accessibility.

It will be appreciated that the reliable sliding movement of the lens cover 6 can be realized by means of the guide section having a relatively simple combination of guide slits 602 and 603 formed in the holding plate 601 installed inside the front case 2c to hold the lens cover 6 and guide protrusions 604 and 605 adapted to slide in the guide slits 602 and 603.

It will be also appreciated that unfailing snap action of the lens cover 6 can be realized by a relatively simple arrangement of the snap action mechanism having the torsion spring 606 fixed at one end thereof to the holding plate 601 and at the other end thereof to the guide protrusion 605 of the lens cover 6.

The inoperative domain of the torsion spring 606 can be lessened by forming the arched protrusion 608 on the holding plate 601 at a position substantially intermediate the fully closed position and the fully open position of the lens cover 6 such that one end of the torsion spring 606 slides on the arched protrusion 608.

By providing the push member 609 on the holding plate 601 for pushing said one end of the torsion spring 606 against the arched protrusion 608, the portion of the torsion spring 606 in sliding contact with the arched protrusion 608 can be prevented from floating from arched protrusion 608, thereby positively minimizing the inoperative domain of the torsion spring 606 that provides snap action.

Thus, a liquid crystal projector 1 having a good external appearance and good maintenance accessibility, and capable of protecting the projection lens 3, can be realized utilizing the lens cover slide mechanism in accordance with the embodiment described above.

Incidentally, in order to prevent a lens cover from being deformed by heat in the event that the lens cover is left closed inadvertently or by malfunction and irradiated by light through the projection lens, some conventional lens covers are provided on the surface thereof with microasperities that are formed by graining to allow part of the light to pass through them.

However, under the circumstance that the light source unit of a projection type image display apparatus such as a liquid crystal projector is increasingly powered up (for a higher luminance), it is likely that the lens cover can be heated to a temperature as high as the melting point of the lens cover if the lens cover is closed inadvertently for a very long time. This can be true if the lens cover is subjected to graining for example and provided on the surface thereof with simple minute microasperities for allowing part of the incident light to pass through them, since the light that has not penetrated the lens cover will heat it.

In this embodiment of the invention, therefore, the lens cover 6 is provided with microasperities in the form of pointed protrusions each having an apex angle in the range that beam of light projected from the projection lens 3 onto any facet of the protrusions will not be totally reflected.

Figure 29:
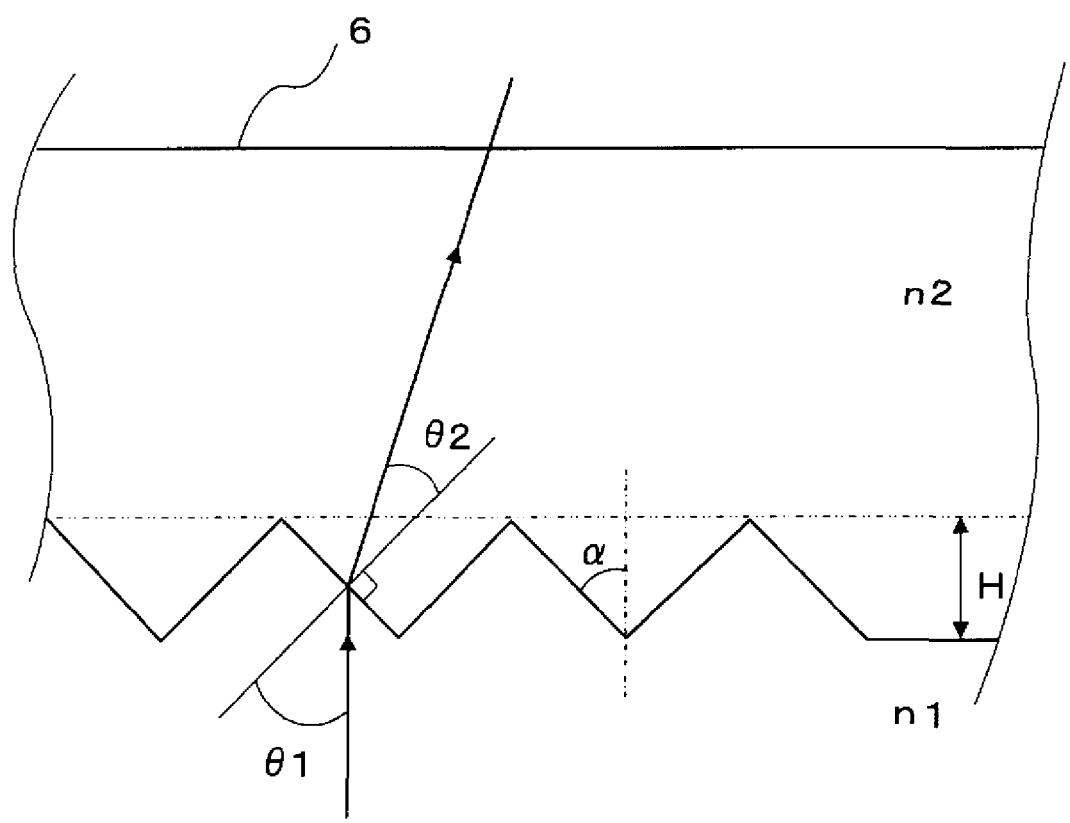
FIG. 29 is a diagram illustrating the asperities formed on the lens cover in accordance with one embodiment of the invention.

FIG. 29 illustrates the protrusions formed on the lens cover 6 in accordance with the embodiment.

Assuming that the medium in contact with the lens cover 6 has a refractive index of n1 (n1 being 1.0 for air) and that the lens cover 6 is made of polycarbonate having refractive index of n2 (n2=1.586), and denoting by $\theta1$ incident angle of a beam of light entering a facet of a protrusion; $\theta2$, refraction angle of the beam; and $2\alpha$, apex angle of the protrusion, the following equations (1) and (2) hold.

$$n1 \cdot \sin \theta1 = n2 \cdot \sin \theta2 \tag{1}$$

$$\theta1 = 90° - \alpha \tag{2}$$

The condition for the beam of light not to be totally reflected from any facet of the protrusions is given by $$2\alpha > 90° - \theta2 \tag{3}$$

Formally, the apex angle $2\alpha$ of equation (3) can be of any magnitude, including 180° that corresponds to a flat plane. To exclude such condition, the apex angle must be less than 180°. On the other hand, the apex angle is preferred to be less than a certain angle, for example 120°, such that then an obscure image is projected on the screen when the lens cover 6 is closed, so that one can recognize from the obscure image that he has forgotten to open the lens cover 6. Thus, equation (3) is replaced by equation (4) below.

$$120° > 2\alpha > 90° - \theta2 \tag{4}$$

The protrusions satisfying these equations can be formed on the lens covers 6 using a metallic mold having inside thereof a plurality of protrusions formed, in the process of graining, by etching the mold with chemicals or by spraying with fine processing powder. For example, the metallic mold can be etched with nitric acid, ferric chloride, or CPL.

It should be noted that although the total reflections are excluded by the above equations, those beams of light will not be exclude that are incident near the apices and get focused inside the lens cover 6, thereby raising the temperature of the lens cover 6. Therefore, it is preferable to work the apices of the protrusions into spherically rounded peaks by, for example, bead processing, or decrease the number of protrusions per unit area by forming larger protrusions. For example, it was observed that when the height H of the protrusions was reduced from 25 μm to 12 μm by bead processing, the temperature of the lens cover 6 lowered by 6 or 7° C.

Thus, constructing the protrusions in the manner as described above, no total reflection or no internal focusing takes place anywhere in the lens cover 6, and heat generated by the incident light is minimized, thereby suppressing the temperature of the lens cover 6 low even if the lens cover is left in closed condition and exposed to light for a long time.

By forming the peaks of the protrusions spherically round, light incident near the peaks are not likely to be focused in the lens cover 6, leaving only little light energy in the lens cover 6, thereby contributing little heat to the lens cover 6.

By enlarging the respective protrusions to decrease the number of protrusions per unit area, the beams of light that focus in the lens cover 6 is lessened, and hence the light energy deposited therein decreases further. Accordingly, the temperature will be still suppressed.

Thus, in accordance with the embodiment described above, a liquid crystal projector 1 having a lens cover 6 that is configured not to be heated to a high temperature if the lens 6 is left closed and exposed to light for a long time, can be realized.

Figure 30:
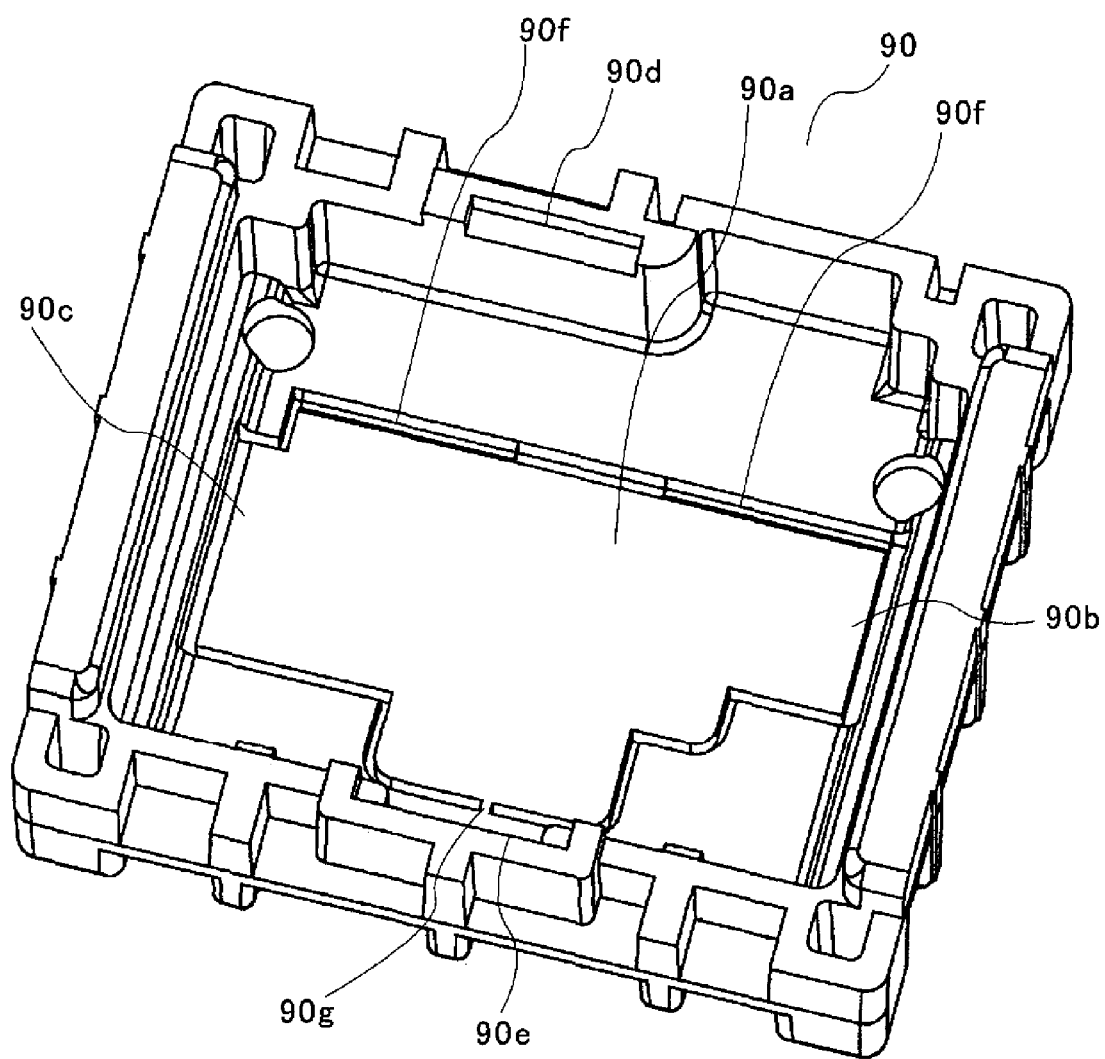
FIG. 30 is a perspective view of an unused packing buffer in accordance with one embodiment of the invention.
Figure 31:
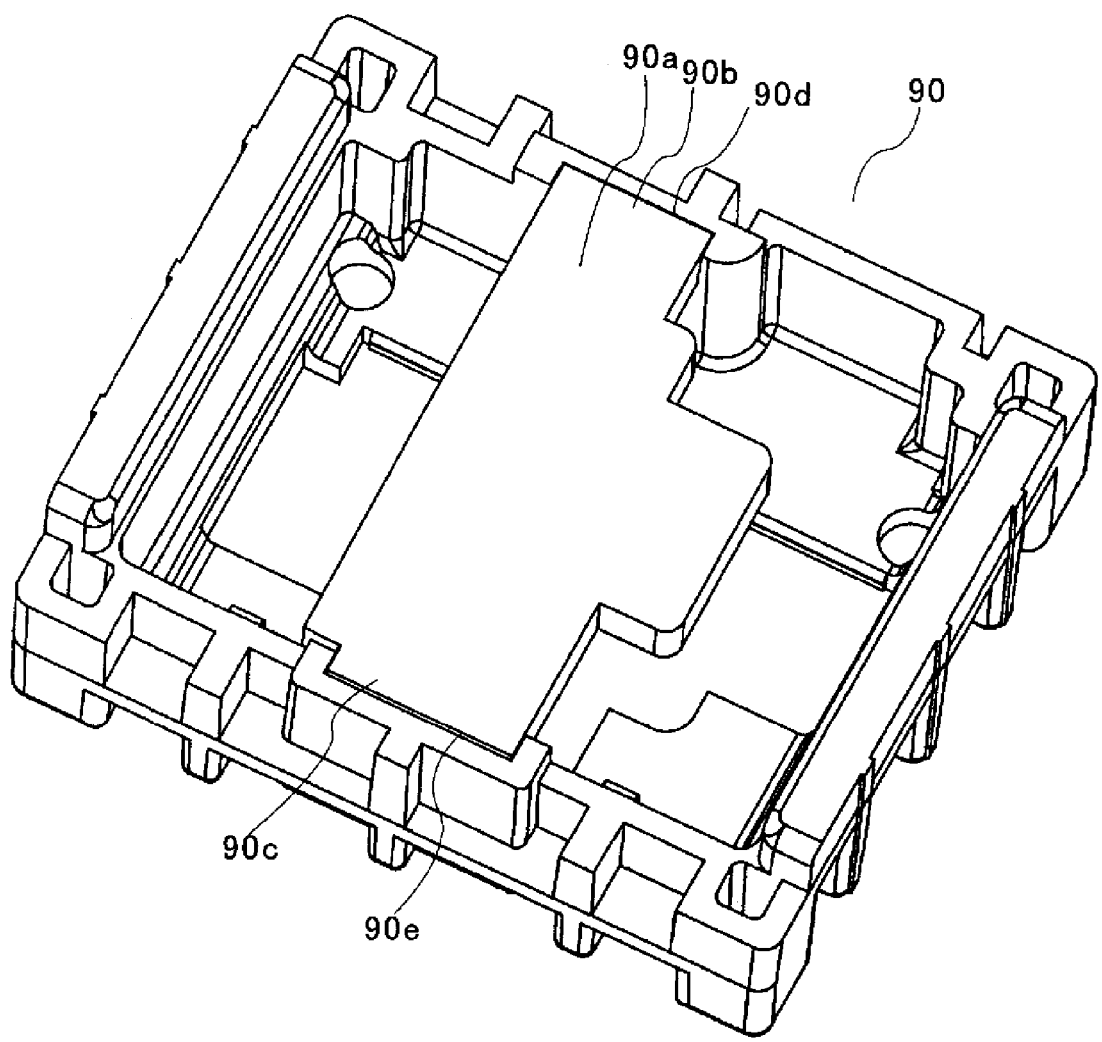
FIG. 31 is a perspective view of the packing buffer in use, with its content omitted.
Figure 32:
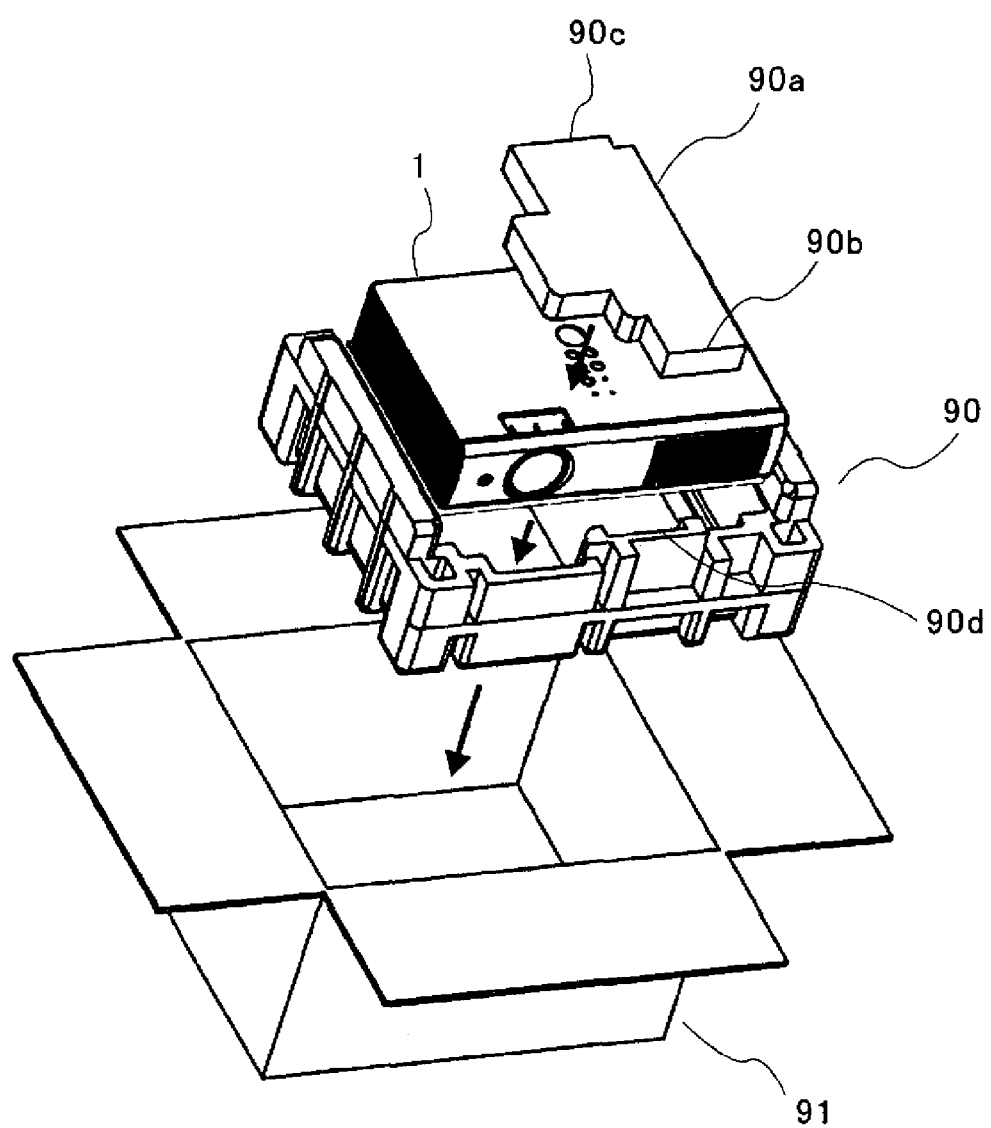
FIG. 32 is an exploded perspective view of a package for shipping an image display apparatus.

Referring to FIGS. 30 through 32, there is shown a configuration and function of a buffer 31 in accordance with one embodiment of the invention. More particularly, FIG. 30 shows in perspective view the buffer 31 before it is used to pack an apparatus; FIG. 31 the buffer assembled for packing; and FIG. 32 the buffer packed with the apparatus in exploded perspective view.

In packing a projection type image display apparatus such as a liquid crystal projector, the projector is conventionally sandwiched between an upper and a lower container-like styrofoam buffer before it is packed in, for example, a cardboard shipping box.

However, conventional packaging requires an upper and a lower container-like buffer, so that many packing parts and work processes are required, which increases the packing cost.

In the embodiment shown herein, therefore, a buffer 90 as shown in FIG. 30 is used to pack the liquid crystal projector 1. Since the liquid crystal projector 1 has a generally rectangular parallelepiped shape as shown in FIG. 1, the buffer 90 also has a shape of a substantially rectangular parallelepiped box having an upper opening at the top end thereof.

An upper holding plate 90a is formed at the bottom end of the buffer 90. The upper holding plate can be removed from the bottom. It is shown to extend in the longitudinal direction of the bottom. Formed in the opposite longer edges of the upper opening of the buffer are engagement recesses 90d and 90e, which can receive therein two opposite edges 90b and 90c of the upper holding plate 90a removed from the bottom of the buffer. In order to give directionality to the upper holding plate 90a, the edges 90b and 90c of the upper holding plate 90a are given different lengths. Correspondingly, so do the engagement recesses 90d and 90e.

The upper holding plate 90a is formed in the bottom end of the generally box-shaped buffer 90, and has a peripheral cut section 90h, except for thin-walled sections 90f, 90f, and 90g.

In this embodiment, the thin-walled sections include longer sections 90f formed at the opposite ends of one side edge of the upper holding plate 90a and a shorter section 90g formed on the opposite side edge of the upper holding plate 90a. The shorter thin-walled section 90g prevents the upper holding plate 90a from dropping off by its self-weight or an external shock before packing.

The upper holding plate 90a can be easily removed by first pushing the shorter thin-walled sections 90f until the thin-walled section breaks off, and by further pushing the longer thin-walled section 90f until the longer thin-walled sections break off. The upper holding plate 90a thus removed can be easily set up by securely fitting the opposite edges 90b and 90c of the upper holding plate 90a in the engagement recesses 90d and 90e formed in the longer edges of the upper opening of the buffer 90, as shown in FIG. 31.

In the process of packing, after removing the upper holding plate 90a from the buffer 90, the buffer 90 is placed in the carton box 91. Then, as shown in FIG. 32, the liquid crystal projector 1 is set in the buffer 90, and the both edges 90b and 90c of the upper holding plate 90a are fitted in the engagement recesses 90d and 90e described above. Finally, the carton box 91 is closed. Packaging is completed by sealing the lids of the box 91 with tape for example.

In this arrangement, the liquid crystal projector 1 can be packed up using just one piece of buffer 90 in a reduced number of steps and at low cost, by removing the upper holding plate 90a from the bottom of a single buffer 90.

It is noted that since the upper holding plate 90a having a peripheral cut section 90h and thin-walled sections 90f, 90g is formed in the bottom end of the box-shaped buffer 90, the upper holding plate 90a can be easily removed from the bottom.

The upper holding plate 90a can be prevented from dropping off the bottom end of the buffer 90 before packing, since the upper holding plate 90a is connected to the buffer 90 via the longer thin-walled sections 90f formed on one opposite end of one side edge and via the shorter thin-walled sections 90g formed on the opposite side edge of the upper holding plate 90a.

Due to the fact that the buffer 90 is a substantially rectangular parallelepiped having an upper opening in correspondence with the shape of the liquid crystal projector 1 being a generally rectangular parallelepiped, and that the buffer 90 is provided in the bottom end thereof with the longitudinally extending removable upper holding plate 90a, and further that the engagement recesses 90d and 90e are formed in the opposing longer edges of the upper opening to receive the both edges 90b and 90c of the upper holding plate 90a therein, it is easy to secure the upper holding plate 90a across the opposing sides of the buffer 90 to bridge the two sides.

It will be appreciated that although a projection type image display apparatus to be packed is a high-precision image display apparatus for projecting imaging light obtained by modulating light emitted from a light source unit based on an image signal, packing can be carried out at low cost and in a reduced number of work steps using the buffer 90.

Although the invention has been described with a particular reference to a liquid crystal projector utilizing LCPs as the optical modulators, the invention can be applied to any other types of projection type image display apparatuses that utilizes different types of imaging light generation system. For example, the invention can be applied to a projector that utilizes DLP technology. (DLP stands for Digital Light Processing, which is a trademark of Texas Instruments, Inc.)

What we claim is:

1. A projection type image display apparatus for projecting imaging light formed by modulating a beam of source light based on an image signal, said image display apparatus equipped with an exhaust mechanism for exhausting air from the image display apparatus that includes a light source unit and discharging said air out of the image display apparatus, said exhaust mechanism having
   a first exhaust fan for mainly exhausting air from said light source unit and discharging said air out of said image display apparatus; and
   a second exhaust fan for mainly exhausting air from the components other than said light source unit and discharging said air out of said image display apparatus, said second exhaust fan having an inspiration face arranged to partly overlap the expiration face of said first exhaust fan.

2. The image display apparatus according to claim 1, wherein said second exhaust fan is adapted to mainly exhaust air from the power supply unit to the outside of the image display apparatus.

3. The image display apparatus according to claim 1 or claim 2, wherein said first and the second exhaust fans are preferably arranged at oblique angles with respect to an exhaust port therefor.

4. The image display apparatus according to claim 1 or claim 2, wherein said first and second exhaust fan are oriented in an oblique forward direction with respect to an exhaust port formed in a side wall of said image display apparatus.

5. The image display apparatus according to claim 1 or 2, wherein said second exhaust fan has less output power than said first exhaust fan.

* * * * *